US 12,521,926 B2

(12) United States Patent
Okunishi et al.

(10) Patent No.: US 12,521,926 B2
(45) Date of Patent: Jan. 13, 2026

(54) RESIN MOLDING DEVICE AND METHOD FOR PRODUCING RESIN MOLDED ARTICLE

(71) Applicant: TOWA CORPORATION, Kyoto (JP)

(72) Inventors: Yoshito Okunishi, Kyoto (JP); Fuyuhiko Ogawa, Kyoto (JP)

(73) Assignee: TOWA CORPORATION, Kyoto (JP)

( * ) Notice: Subject to any disclaimer, the term of this patent is extended or adjusted under 35 U.S.C. 154(b) by 155 days.

(21) Appl. No.: 18/275,406

(22) PCT Filed: Nov. 12, 2021

(86) PCT No.: PCT/JP2021/041648
§ 371 (c)(1),
(2) Date: Aug. 2, 2023

(87) PCT Pub. No.: WO2022/201624
PCT Pub. Date: Sep. 29, 2022

(65) Prior Publication Data
US 2024/0116229 A1 Apr. 11, 2024

(30) Foreign Application Priority Data
Mar. 24, 2021 (JP) ................................ 2021-050847

(51) Int. Cl.
B29C 45/76 (2006.01)
B29C 45/02 (2006.01)
(Continued)

(52) U.S. Cl.
CPC ........ B29C 45/7653 (2013.01); B29C 45/021 (2013.01); B29C 45/64 (2013.01);
(Continued)

(58) Field of Classification Search
CPC ......... B29C 33/12; B29C 33/68; B29C 45/02; B29C 45/021; B29C 45/14065;
(Continued)

(56) References Cited

U.S. PATENT DOCUMENTS

| 2012/0146260 A1* | 6/2012 | Murata | ................... B29C 45/77 |
| | | | 264/328.1 |
| 2021/0187809 A1* | 6/2021 | Akiyama | ............... B29C 45/766 |
| 2022/0161469 A1* | 5/2022 | Okunishi | ................ B29C 33/68 |

FOREIGN PATENT DOCUMENTS

| JP | 2015005611 | 1/2015 |
| JP | 2020090010 | 6/2020 |

(Continued)

OTHER PUBLICATIONS

"International Search Report (Form PCT/ISA/210) of PCT/JP2021/041648", mailed on Dec. 14, 2021, with English translation thereof, pp. 1-4.
(Continued)

Primary Examiner — Thu Khanh T. Nguyen
(74) Attorney, Agent, or Firm — JCIPRNET

(57) ABSTRACT

A resin molding device includes: a lower mold on which a substrate is placed; an upper mold in which a cavity is formed by a side block and a cavity block provided so as to be capable of ascending and descending vertically with respect to the side block; a clamp mechanism which clamps the lower mold and the upper mold; a transfer mechanism which supplies a resin material to the cavity by a plunger; and a controller which performs first final adjustment control for adjusting a clamp load of the clamp mechanism to a final clamp load after the cavity has been filled with the resin material supplied from the transfer mechanism and which performs second final adjustment control for driving the plunger after the first adjustment control has been completed (Continued)

and thereby adjusting a plunger load applied to the plunger to a final plunger load.

9 Claims, 10 Drawing Sheets

(51) Int. Cl.
    *B29C 45/64*     (2006.01)
    *B29C 45/77*     (2006.01)

(52) U.S. Cl.
    CPC .... *B29C 45/77* (2013.01); *B29C 2945/76709* (2013.01); *B29C 2945/76829* (2013.01)

(58) Field of Classification Search
    CPC ........ B29C 45/14639; B29C 45/14663; B29C 45/36; B29C 45/376; B29C 45/56; B29C 45/64; B29C 45/766; B29C 45/78
    See application file for complete search history.

(56) References Cited

FOREIGN PATENT DOCUMENTS

| | | |
|---|---|---|
| JP | 2020179604 | 11/2020 |
| TW | 202021771 | 6/2020 |
| TW | 202039199 | 11/2020 |

OTHER PUBLICATIONS

"Office Action of Taiwan Counterpart Application", issued on Feb. 6, 2023, with English translation thereof, p. 1-p. 13.

"Written Opinion of the International Searching Authority (Form PCT/ISA/237) of PCT/JP2021/041648," mailed on Dec. 14, 2021, with English translation thereof, pp. 1-8.

"Office Action of Taiwan Counterpart Application", issued on Sep. 13, 2023, with English translation thereof, p. 1-p. 11.

\* cited by examiner

RESIN MOLDING DEVICE AND METHOD FOR PRODUCING RESIN MOLDED ARTICLE

CROSS-REFERENCE TO RELATED APPLICATION

This application is a 371 application of the International PCT application serial no. PCT/JP2021/041648, filed on Nov. 12, 2021, which claims the priority benefit of Japan Patent Application No. 2021-050847, filed on Mar. 24, 2021. The entirety of each of the above-mentioned patent applications is hereby incorporated by reference herein and made a part of this specification.

TECHNICAL FIELD

The present invention relates to a technology of a resin molding device and a method for producing a resin molded article.

RELATED ART

Patent Literature 1 discloses a resin molding device, including a lower mold on which a substrate is placed, an upper mold in which a cavity is formed by an upper mold cavity frame member and a cavity block, a mold clamping mechanism which clamps the lower mold and the upper mold, and a plunger which supplies a resin material into the cavity. This resin molding device is capable of adjusting the depth of the cavity to an appropriate depth by adjusting the position of the cavity block with respect to the upper mold cavity frame member.

CITATION LIST

Patent Literature

Patent Literature 1: Japanese Patent Laid-Open No. 2020-179604

SUMMARY OF INVENTION

Technical Problem

Here, with the expansion of the technical fields to which resin molded articles are applied, the demand for precision required for resin molded articles has increased in recent years. Therefore, there is a need for a technology capable of producing a resin molded article with higher precision.

The present invention has been made in view of the above circumstances, and the problem to be solved is to provide a resin molding device and a method for producing a resin molded article that make it possible to produce a resin molded article with high precision.

Solution to Problem

The problem to be solved by the present invention is as described above, and in order to solve this problem, a resin molding device according to the present invention includes: a lower mold on which a substrate is placed; an upper mold in which a cavity is formed by a side block and a cavity block that is provided so as to be capable of ascending and descending vertically with respect to the side block; a clamp mechanism, clamping the lower mold and the upper mold; a transfer mechanism, supplying a resin material to the cavity by a plunger; and a controller, performing first final adjustment control that adjusts a clamp load applied by the clamp mechanism to be a final clamp load after the cavity is filled with the resin material supplied from the transfer mechanism, and second final adjustment control that adjusts a plunger load applied to the plunger to be a final plunger load by driving the plunger after the first final adjustment control is completed.

Further, a method for producing a resin molded article according to the present invention produces a resin molded article using the resin molding device.

Further, a method for producing a resin molded article according to the present invention includes: a clamping process of clamping a lower mold and an upper mold by a clamp mechanism, the lower mold having a substrate placed thereon, the upper mold having a cavity formed therein by a side block and a cavity block that is provided so as to be capable of ascending and descending vertically with respect to the side block; a resin material supplying process of supplying a resin material to the cavity by a plunger; a first final adjusting process of adjusting a clamp load applied by the clamp mechanism to be a final clamp load after the cavity is filled with the resin material; and a second final adjusting process of driving the plunger so that a plunger load applied to the plunger becomes a final plunger load after the clamp load applied by the clamp mechanism has become the final clamp load.

Effects of Invention

According to the present invention, it is possible to produce a resin molded article with high precision.

Figure 3:
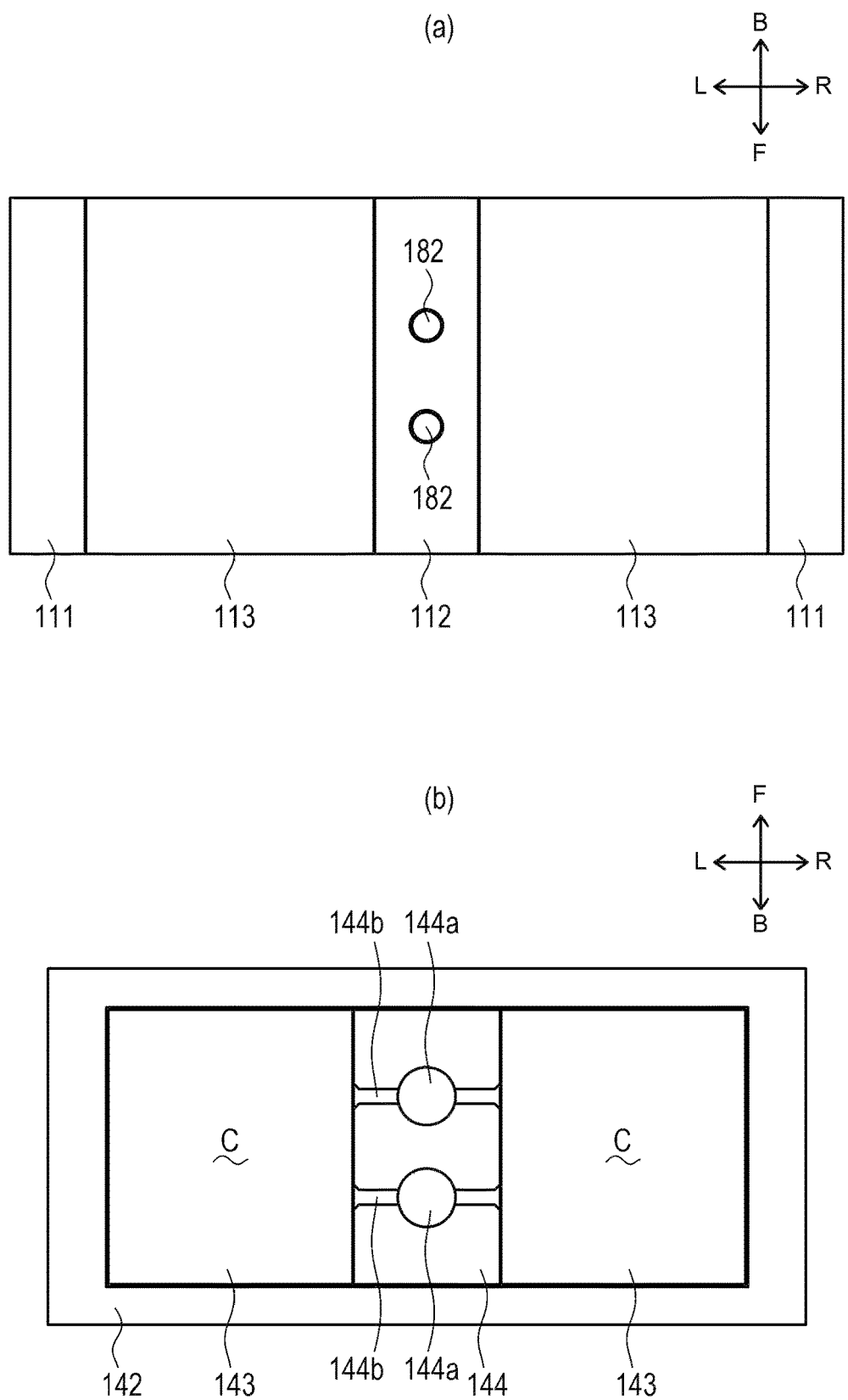

(a) of FIG. 3 is a schematic plan view showing a configuration of a lower mold according to an embodiment, as viewed from a mold surface side (upper side). (b) of FIG. 3 is a schematic bottom view showing a configuration of an upper mold according to an embodiment, as viewed from a mold surface side (lower side).

Figure 4:
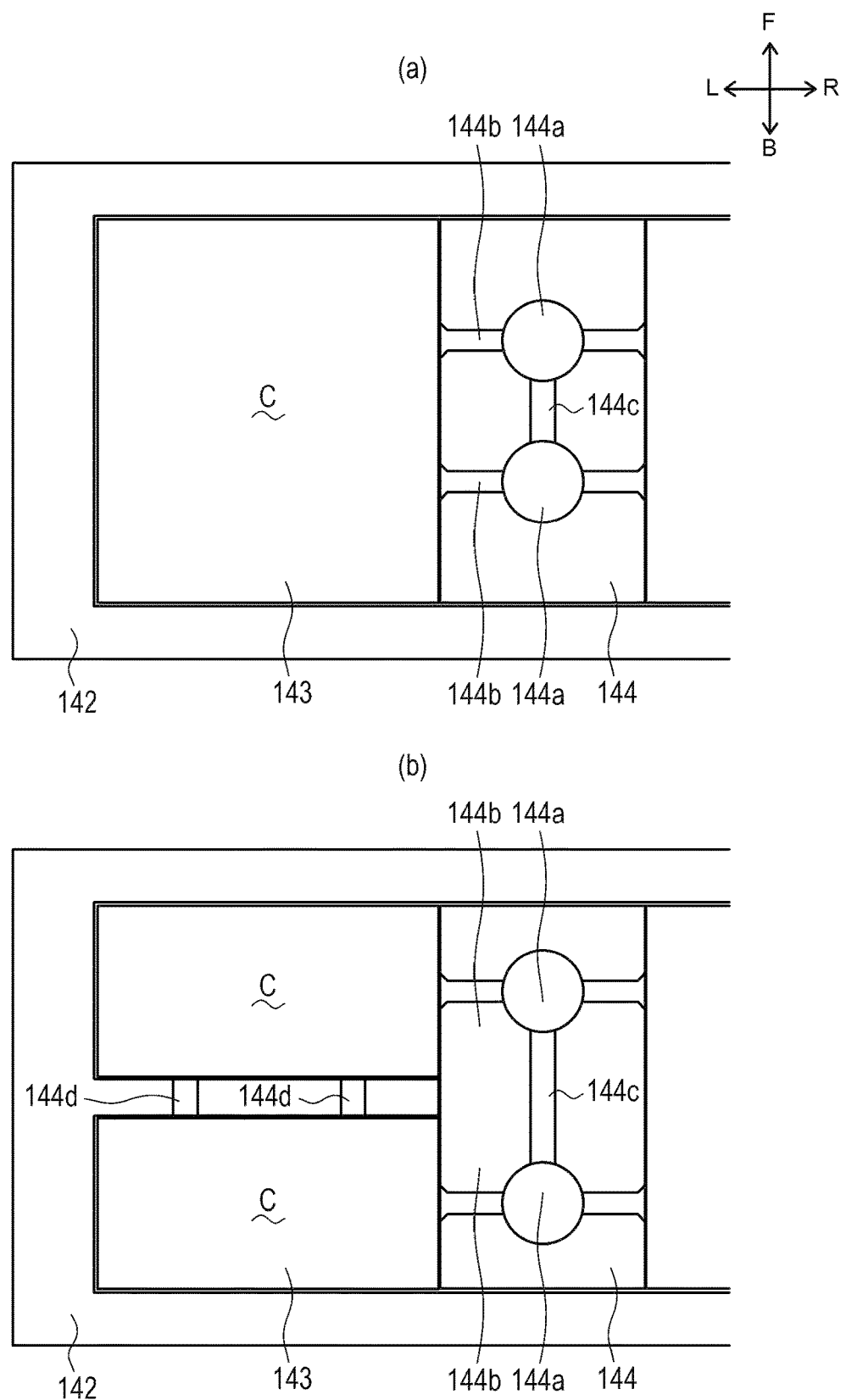

(a) of FIG. 4 is a schematic plan view showing a connecting groove that connects cull portions to each other. (b) of FIG. 4 is a schematic plan view showing an example in which the cull portions are connected to each other via a cavity.

Figure 5:
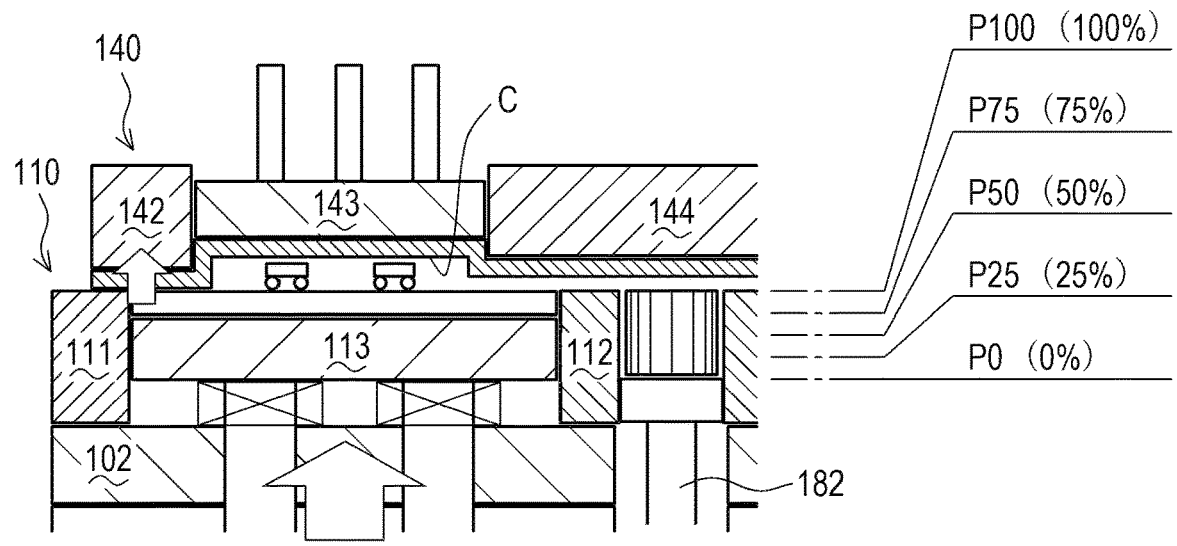
Figure 5:
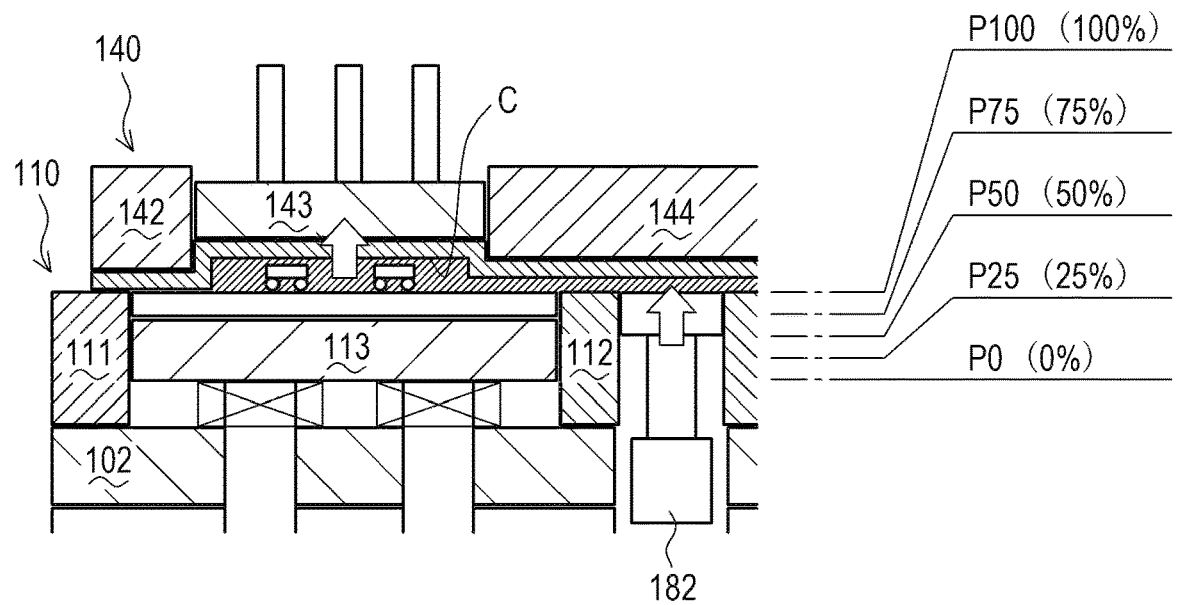

(a) of FIG. 5 is a front cross-sectional view showing how the depth of the cavity decreases when clamped by a mold clamping mechanism. (b) of FIG. 5 is a front cross-sectional view showing how the depth of the cavity increases when resin is supplied by a plunger.

Figure 6:
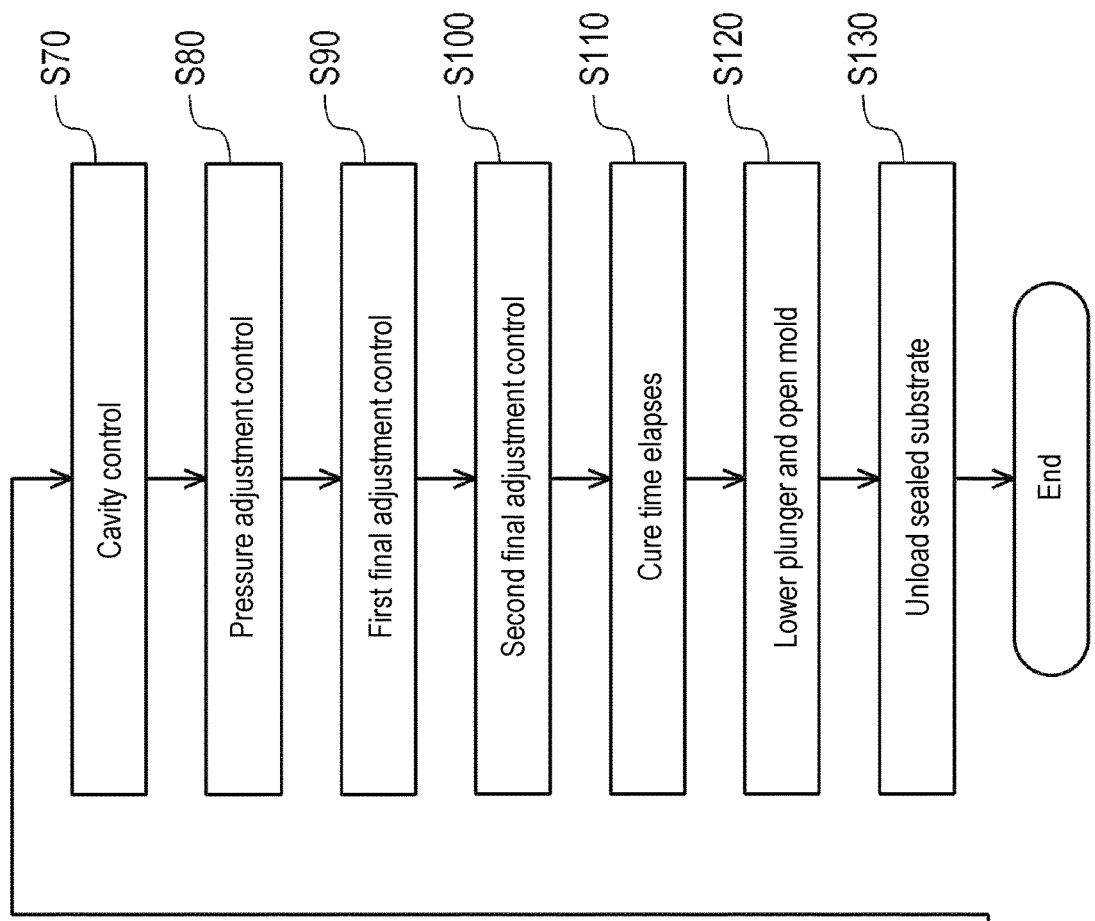
Figure 6:
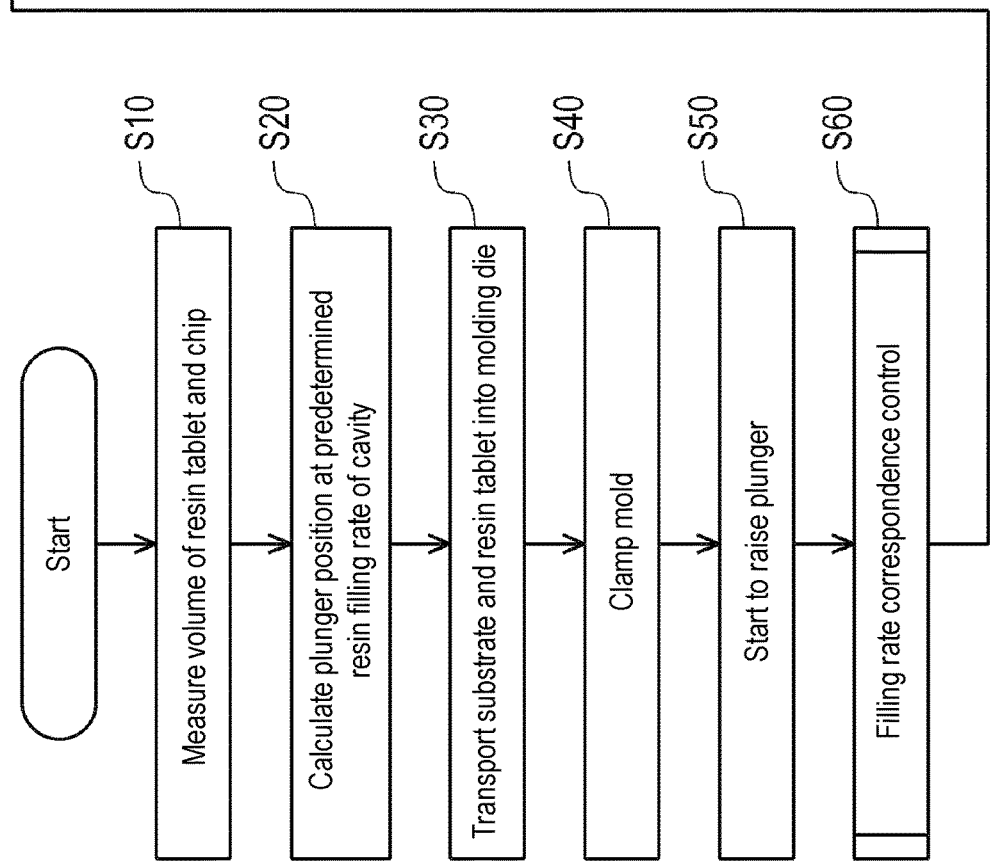

FIG. 6 is a flowchart showing an example of a method for producing a resin molded article.

Figure 7:
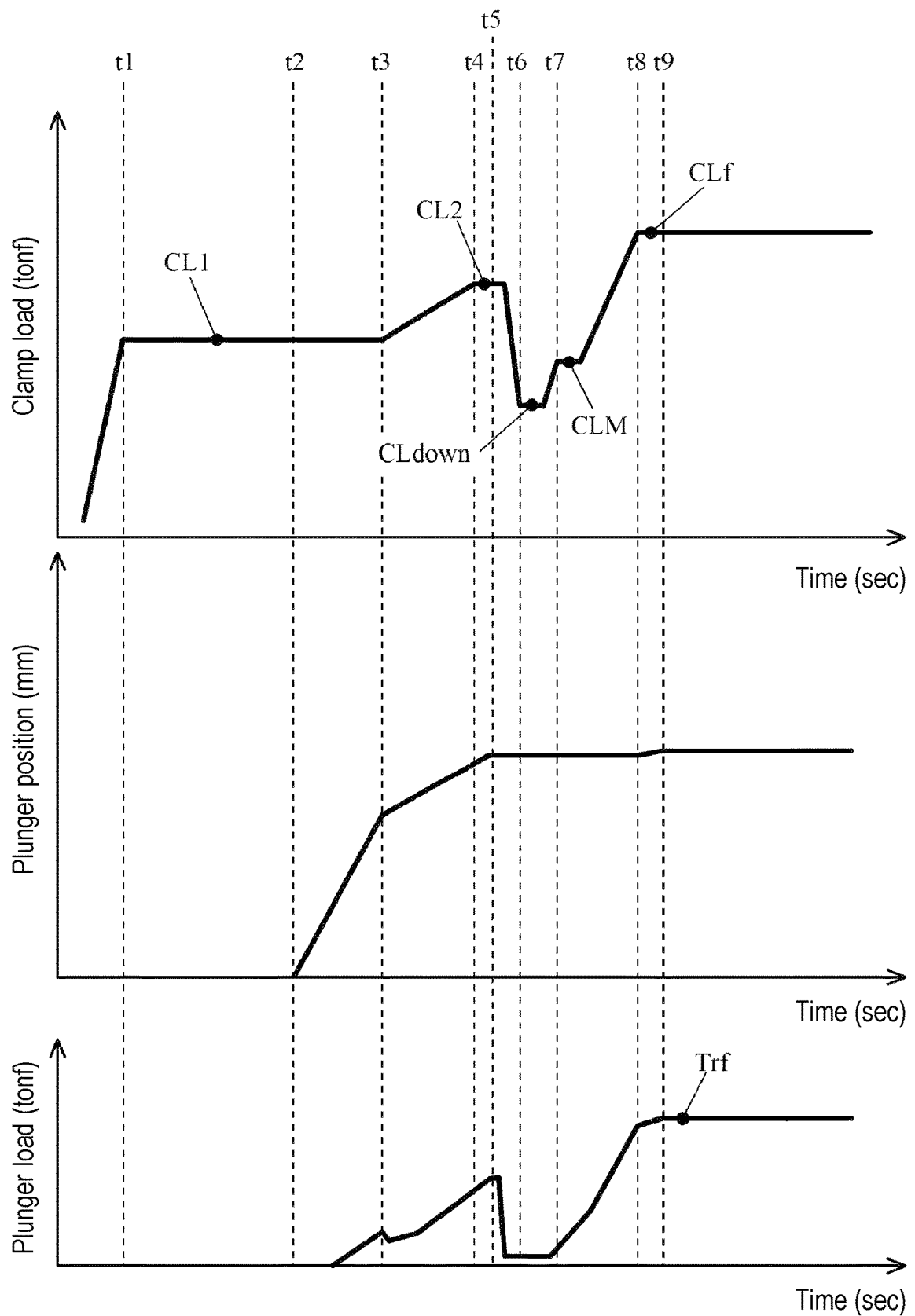

FIG. 7 is a diagram showing changes over time of clamp load, plunger position, and plunger load according to a first control mode.

Figure 8:
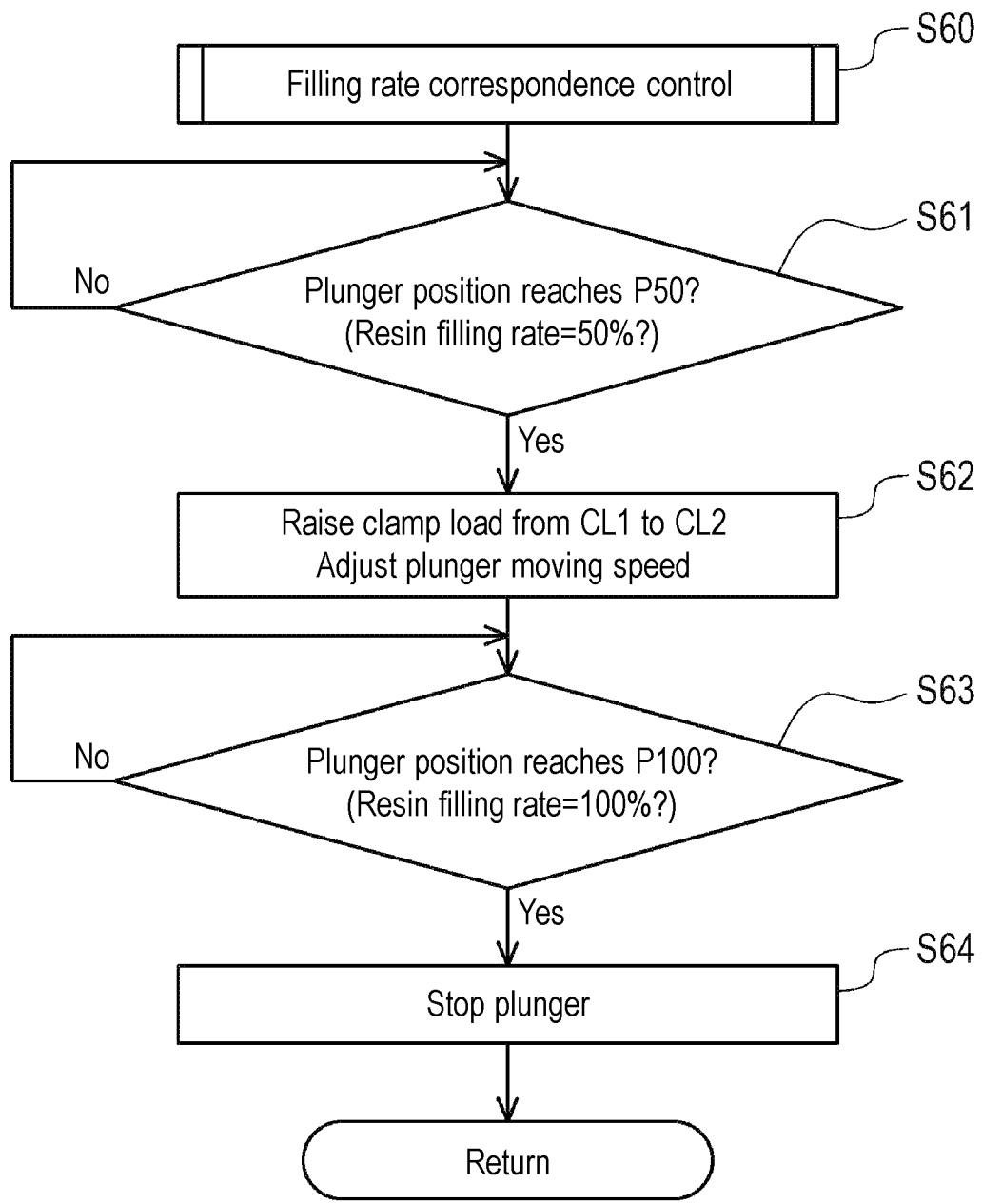

FIG. 8 is a flowchart showing a specific example of filling rate correspondence control.

Figure 9:
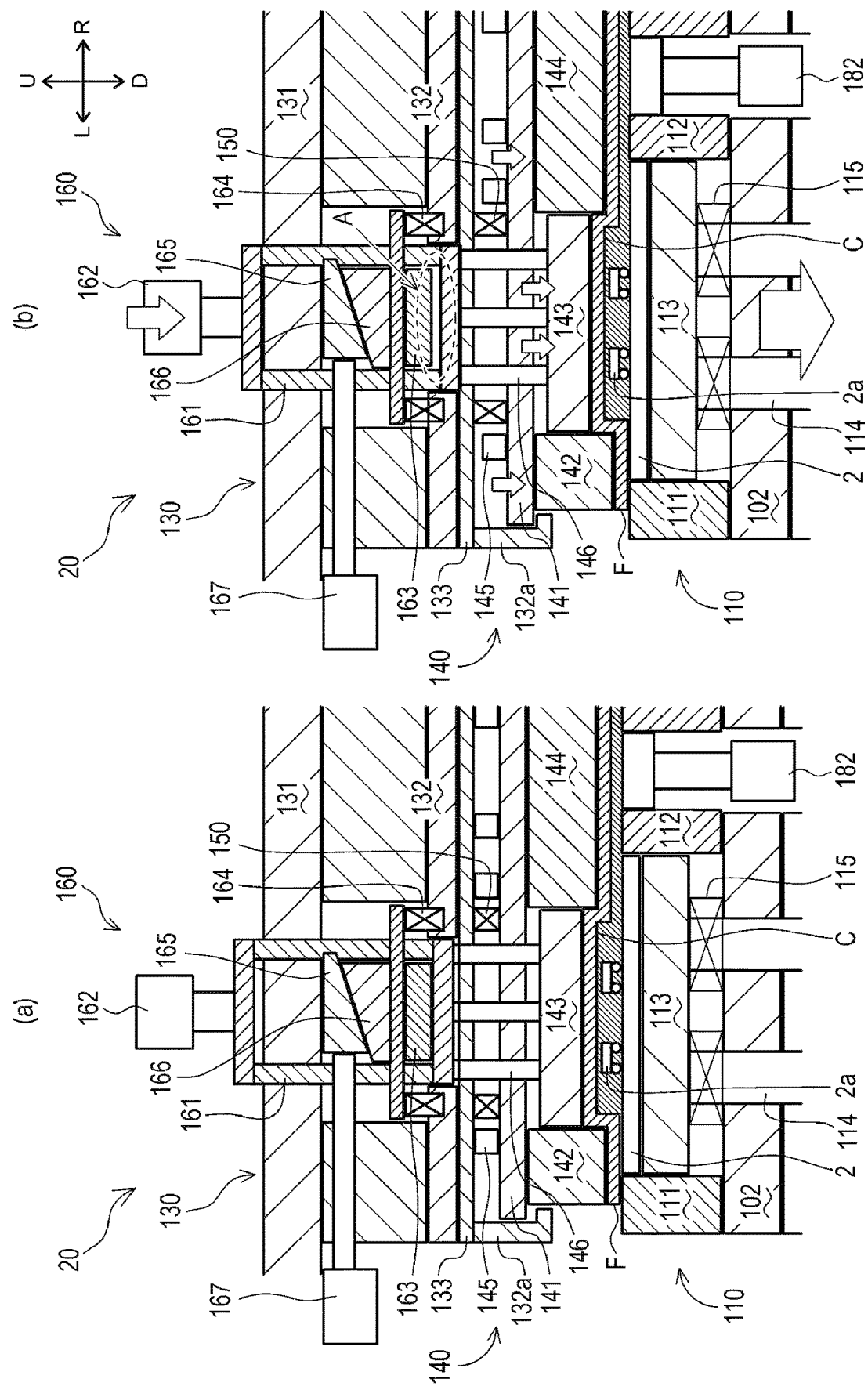

(a) of FIG. 9 is a front cross-sectional view showing the lower mold and the upper mold in the mold-clamped state.

(b) of FIG. 9 is a front cross-sectional view showing the lower mold and the upper mold in a state where the clamp load is reduced.

Figure 10:
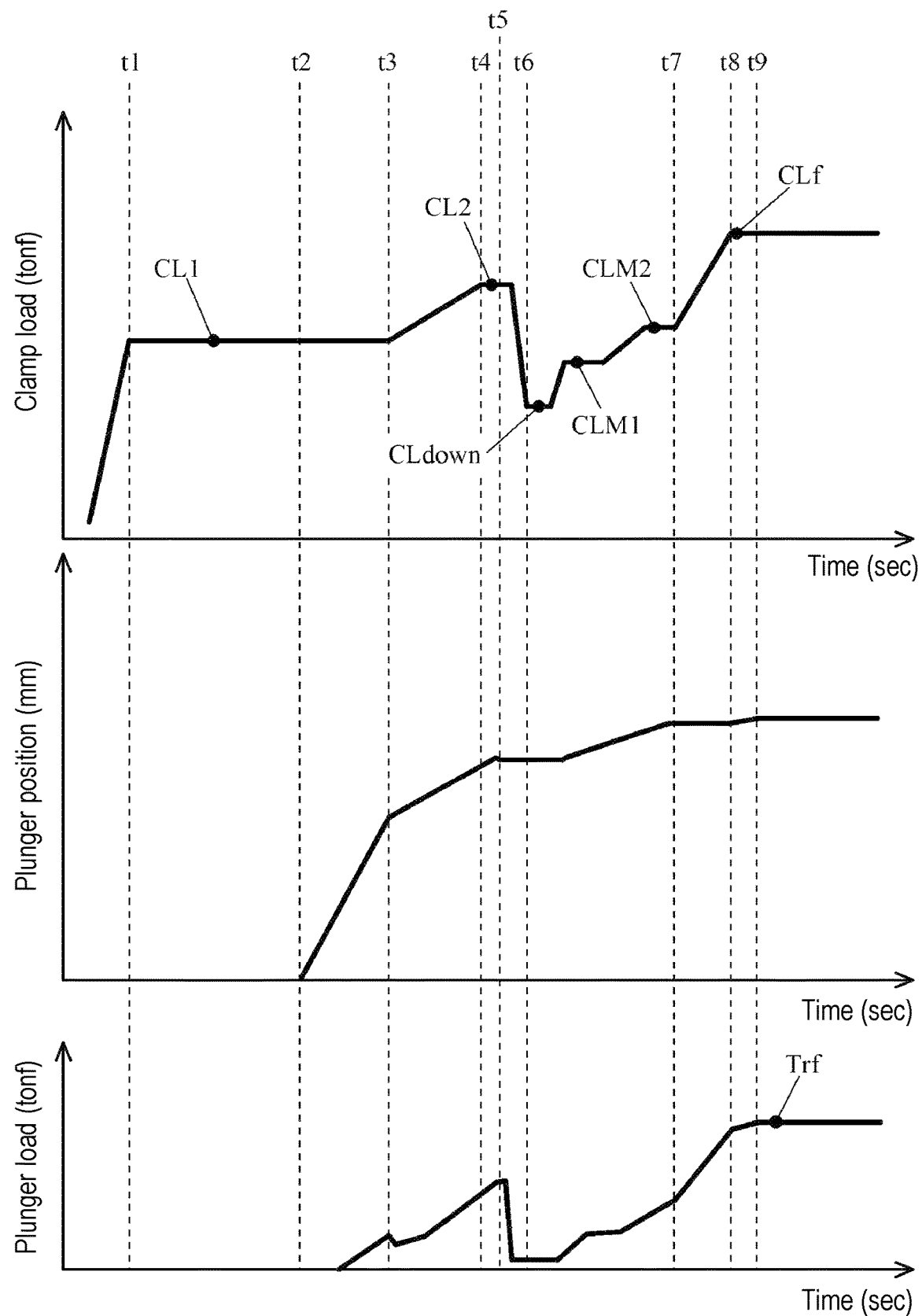

FIG. 10 is a diagram showing changes over time of clamp load, plunger position, and plunger load according to a second control mode.

DESCRIPTION OF EMBODIMENTS

The following will be described with the directions indicated by the arrow U, arrow D, arrow L, arrow R, arrow F, and arrow B shown in the drawings defined as the upward, downward, leftward, rightward, forward, and backward directions, respectively.

<Overall Configuration of Resin Molding Device 1>

Figure 1:
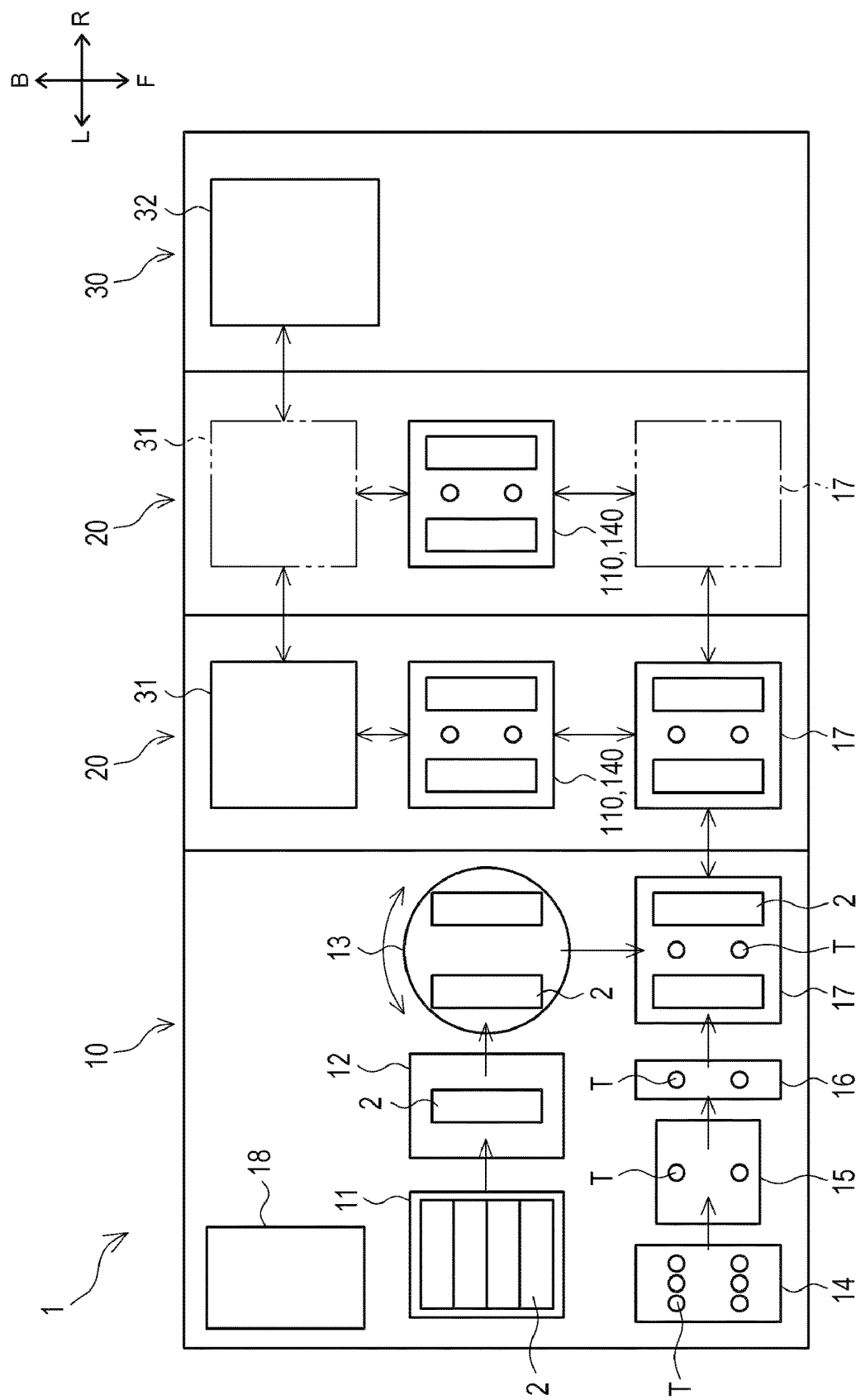
FIG. 1 is a schematic plan view showing the overall configuration of a resin molding device according to an embodiment.

First, a configuration of a resin molding device 1 according to a first embodiment will be described with reference to FIG. 1. The resin molding device 1 is a device for producing a resin molded article by resin-sealing an electronic element such as a semiconductor chip (hereinafter simply referred to as "chip 2a"). In particular, this embodiment exemplifies the resin molding device 1 that performs resin molding using a transfer molding method.

The resin molding device 1 includes a supply module 10, a resin molding module 20, and an unloading module 30 as components. Each component is removable and replaceable with respect to other components.

<Supply Module 10>

The supply module 10 supplies a lead frame (hereinafter simply referred to as "substrate 2") which is a type of substrate on which the chip 2a is mounted, and a resin tablet T to the resin molding module 20. Although the lead frame is exemplified as the substrate 2 in this embodiment, it is possible to use various other substrates (glass epoxy substrate, ceramic substrate, resin substrate, metal substrate, and the like) in addition to the lead frame. The supply module 10 mainly includes a frame delivery part 11, a frame measurement part 12, a frame supply part 13, a resin delivery part 14, a resin measurement part 15, a resin supply part 16, a loader 17, and a controller 18.

The frame delivery part 11 delivers the substrate 2 that is not resin-sealed and housed in an in-magazine unit (not shown) to the frame measurement part 12. The frame measurement part 12 measures the volume of the chip 2a mounted on the substrate 2. The frame measurement part 12 is an embodiment of a chip volume measurement part of the present application. Details of the frame measurement part 12 will be described later. The substrate 2 for which the measurement in the frame measurement part 12 has been completed is delivered to the frame supply part 13. The frame supply part 13 receives the substrate 2 from the frame measurement part 12, properly aligns the received substrate 2, and delivers the substrate 2 to the loader 17.

The resin delivery part 14 receives the resin tablet T from a stocker (not shown) and delivers the resin tablet T to the resin measurement part 15. The resin measurement part 15 measures the weight (volume) of the resin tablet T. The resin measurement part 15 is an embodiment of a resin volume measurement part of the present application. Details of the resin measurement part 15 will be described later. The resin tablet T for which the measurement in the resin measurement part 15 has been completed is delivered to the resin supply part 16. The resin supply part 16 receives the resin tablet T from the resin measurement part 15, properly aligns the received resin tablet T, and delivers the resin tablet T to the loader 17.

The loader 17 transports the substrate 2 and the resin tablet T received from the frame supply part 13 and the resin supply part 16 to the resin molding module 20.

The controller 18 controls the operation of each module of the resin molding device 1. The controller 18 is an embodiment of a calculation part of the present application. The operations of the supply module 10, the resin molding module 20, and the unloading module 30 are controlled by the controller 18. Also, the operation of each module can be freely changed (adjusted) using the controller 18.

Although this embodiment shows an example in which the controller 18 is provided in the supply module 10, it is also possible to provide the controller 18 in another module. Besides, it is also possible to provide a plurality of controllers 18. For example, it is possible to provide the controller 18 for each module or for each device, and individually control the operations of the modules or the like while interlocking the operations.

<Resin Molding Module 20>

The resin molding module 20 resin-seals the chip 2a mounted on the substrate 2. In this embodiment, two resin molding modules 20 are arranged side by side. By performing the resin sealing for the substrate 2 in parallel with two resin molding modules 20, the production efficiency of the resin molded article can be improved. The resin molding module 20 mainly includes a molding die (lower mold 110 and upper mold 140) and a mold clamping mechanism 190 (see FIG. 2).

The molding dies (lower mold 110 and upper mold 140) resin-seal the chip 2a mounted on the substrate 2 using a molten resin material. The molding dies include a pair of upper and lower molds, that is, the lower mold 110 and the upper mold 140 (see FIG. 2, etc.). The molding dies are provided with a heating part (not shown) such as a heater.

The mold clamping mechanism 190 (see FIG. 2) clamps or opens the molding dies (lower mold 110 and upper mold 140) by moving the lower mold 110 vertically.

<Unloading Module 30>

The unloading module 30 receives the resin-sealed substrate 2 from the resin molding module 20 and unloads the resin-sealed substrate 2. The unloading module 30 mainly includes an unloader 31 and a substrate housing part 32.

The unloader 31 holds the resin-sealed substrate 2 and unloads the resin-sealed substrate 2 to the substrate housing part 32. The substrate housing part 32 houses the resin-sealed substrate 2.

<Overview of Operation of Resin Molding Device 1>

Next, the overview of the operation of the resin molding device 1 configured as described above (method for producing a resin molded article using the resin molding device 1) will be described with reference to FIG. 1 and FIG. 2.

In the supply module 10, the frame delivery part 11 delivers the substrate 2 housed in the in-magazine unit (not shown) to the frame measurement part 12. After measuring the volume of the chip 2a of the received substrate 2, the frame measurement part 12 delivers the substrate 2 to the frame supply part 13. The frame supply part 13 properly aligns the received substrate 2 and delivers the substrate 2 to the loader 17.

Further, the resin delivery part 14 delivers the resin tablet T received from the stocker (not shown) to the resin measurement part 15. After measuring the weight (volume) of the received resin tablet T, the resin measurement part 15 delivers the resin tablet T to the resin supply part 16. The resin supply part 16 delivers the required number of the received resin tablets T to the loader 17. The loader 17 transports the received substrate 2 and resin tablet T to the molding dies of the resin molding module 20.

In the resin molding module 20, the mold clamping mechanism 190 clamps the molding dies. Then, the resin tablet T is heated and melted by the heating part (not shown) of the molding dies, and the substrate 2 is resin-sealed using the generated molten resin.

After the resin sealing is completed, the mold clamping mechanism 190 opens the molding dies. Then, the resin-sealed substrate 2 is released. Thereafter, the unloader 31 unloads the substrate 2 from the molding dies and stores the substrate 2 in the substrate housing part 32 of the unloading module 30. At this time, unnecessary portions (unnecessary resin such as culls and runners) of the resin-molded substrate 2 are properly removed. Thus, the resin-sealed substrate 2 (resin molded article) is produced.

<Detailed Configuration of Resin Molding Module 20>

Next, the configuration of the resin molding module 20 will be described in more detail. As shown in FIG. 2, the resin molding module 20 mainly includes a lower mold setting part 100, the lower mold 110, a lower mold cavity adjustment mechanism 120, an upper mold setting part 130, the upper mold 140, a disc spring 150, an upper mold cavity adjustment mechanism 160, an air vent opening/closing mechanism 170, a transfer mechanism 180, and the mold clamping mechanism 190.

<Lower Mold Setting Part 100>

Figure 2:
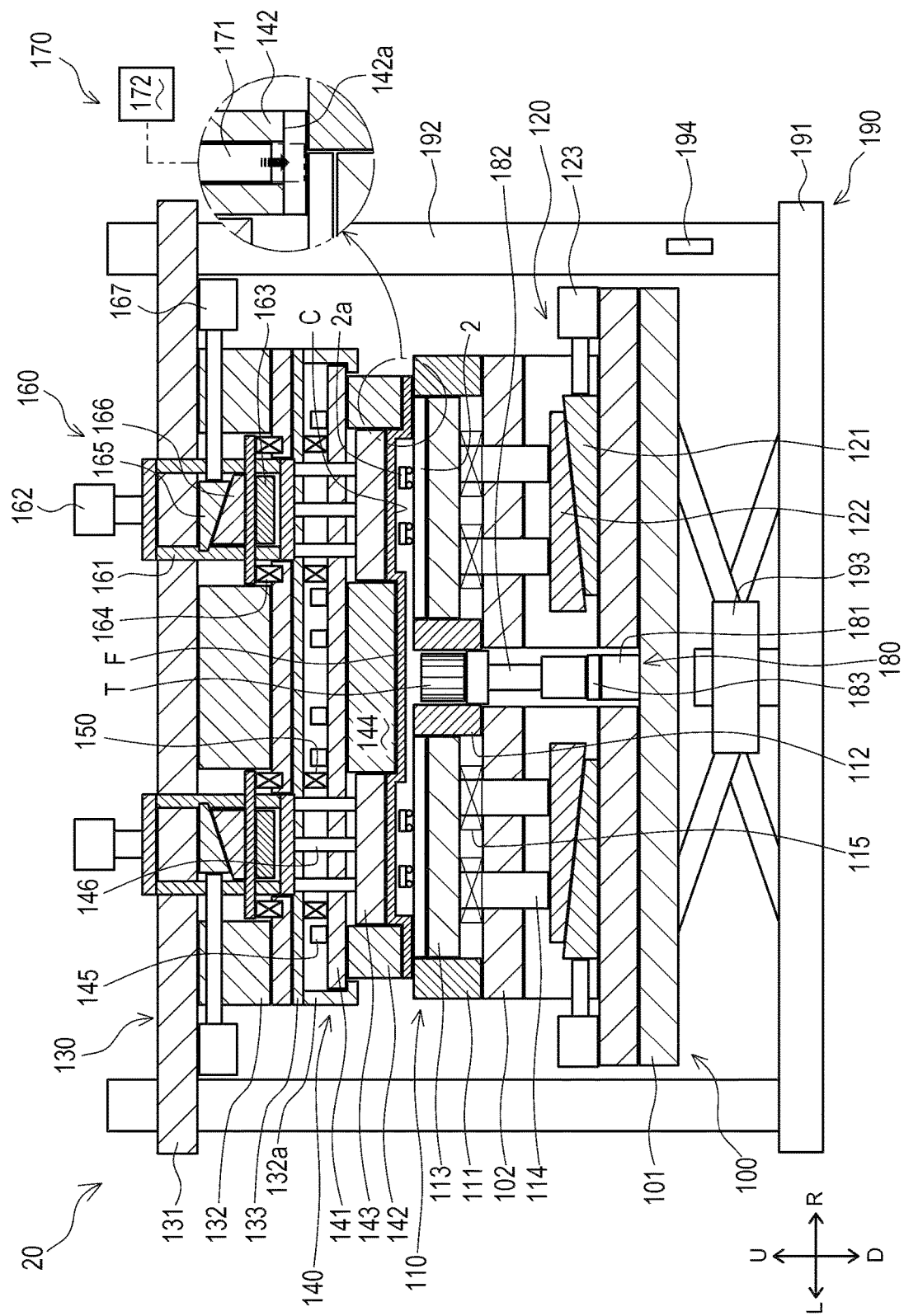
FIG. 2 is a front cross-sectional view showing a configuration of a resin molding module according to an embodiment.

The lower mold setting part 100 shown in FIG. 2 is a part where the lower mold 110 is provided. The lower mold setting part 100 mainly includes a lower mold movable base portion 101 and a lower mold attachment portion 102.

The lower mold movable base portion 101 forms the lower portion of the lower mold setting part 100. The lower mold attachment portion 102 is a portion to which the lower mold 110 is attached. The lower mold attachment portion 102 is provided in the upper portion of the lower mold movable base portion 101.

<Lower Mold 110>

The lower mold 110 shown in FIG. 2, (a) of FIG. 3, and FIG. 9 forms the lower portion of the molding dies. The lower mold 110 mainly includes a lower mold side block 111, a pot block 112, a lower mold cavity block 113, a lower mold pillar 114, and a lower mold elastic member 115. In the lower mold 110 of this embodiment, as shown in (a) of FIG. 3, the pot block 112 is provided in the center, the lower mold cavity block 113 is arranged on the left and right sides thereof, and the lower mold side block 111 is arranged further outside the lower mold cavity block 113.

The lower mold side block 111 forms the outer peripheral portion of the lower mold 110. The lower mold side block 111 is provided on the upper surface of the lower mold attachment portion 102.

The pot block 112 is a portion in which the resin tablet T supplied from the supply module 10 is housed. A plurality of through holes (pots) for housing the resin tablets T are formed in the pot block 112. The pot block 112 is arranged to be sandwiched between the lower mold cavity blocks 113 on the left and right sides. The pot block 112 is provided on the upper surface of the lower mold attachment portion 102.

The lower mold cavity block 113 is a portion on which the substrate 2 is placed. The lower mold cavity block 113 is arranged between the lower mold side block 111 and the pot block 112. The lower mold cavity block 113 is arranged so as to be relatively movable in the up-down direction with respect to the lower mold side block 111 and the pot block 112.

The lower mold pillar 114 is a member arranged to extend downward from the lower mold cavity block 113. The upper end of the lower mold pillar 114 is fixed to the lower portion of the lower mold cavity block 113.

The lower mold elastic member 115 applies a force upward to the lower mold cavity block 113. The lower mold elastic member 115 is formed by, for example, a compression coil spring. The lower mold elastic member 115 is arranged between the lower mold cavity block 113 and the lower mold attachment portion 102. Due to the urging force of the lower mold elastic member 115, the lower mold cavity block 113 is constantly applied with an upward force.

<Lower Mold Cavity Adjustment Mechanism 120>

The lower mold cavity adjustment mechanism 120 shown in FIG. 2 adjusts the position of the lower mold cavity block 113. The lower mold cavity adjustment mechanism 120 mainly includes a lower mold first wedge member 121, a lower mold second wedge member 122, and a lower mold wedge member driving part 123.

The lower mold first wedge member 121 and the lower mold second wedge member 122 are a pair of members in which tapered portions are formed on surfaces facing each other. The lower mold second wedge member 122 is arranged above the lower mold first wedge member 121. The lower mold second wedge member 122 is arranged below the lower mold pillar 114. The downward movement of the lower mold cavity block 113 is regulated by the contact of the lower end of the lower mold pillar 114 with the lower mold second wedge member 122. Thereby, the position of the lower mold cavity block 113 is defined.

The lower mold wedge member driving part 123 moves the lower mold first wedge member 121 in the horizontal direction (left-right direction). The lower mold wedge member driving part 123 is formed by, for example, a servomotor, an air cylinder, or the like. The lower mold wedge member driving part 123 is connected to the lower mold first wedge member 121 via an appropriate power transmission member. By driving the lower mold wedge member driving part 123, the lower mold first wedge member 121 can be freely moved in the left-right direction.

The position of the lower mold cavity block 113 can be adjusted by the lower mold cavity adjustment mechanism 120 configured in this way. Specifically, when the lower mold wedge member driving part 123 is driven to move the lower mold first wedge member 121 in the left-right direction, the lower mold second wedge member 122 in contact with the lower mold first wedge member 121 is displaced vertically along the tapered portion. By vertically displacing the lower mold second wedge member 122, the position where the downward movement of the lower mold pillar 114 is regulated is displaced, and thus the position of the lower mold cavity block 113 can be adjusted.

<Upper Mold Setting Part 130>

The upper mold setting part 130 shown in FIG. 2 and FIG. 9 is a part where the upper mold 140 is provided. The upper mold setting part 130 is an embodiment of an upper mold support part of the present application. The upper mold setting part 130 mainly includes an upper mold fixing base portion 131, an upper mold attachment portion 132, and a heater plate 133.

The upper mold fixing base portion 131 forms the upper portion of the upper mold setting part 130. The upper mold attachment portion 132 is a portion to which the upper mold 140 is attached. The upper mold attachment portion 132 is formed by combining a plurality of members. The upper mold attachment portion 132 is provided in the lower portion of the upper mold fixing base portion 131. A support portion 132a that supports the upper mold 140 (upper mold base portion 141), which will be described later, from below is provided on the outer peripheral portion of the upper mold attachment portion 132. The heater plate 133 is for heating the upper mold 140. The heater plate 133 is provided on the bottom surface of the upper mold attachment portion 132.

<Upper Mold 140>

The upper mold 140 shown in FIG. 2, (b) of FIG. 3, and FIG. 9 forms the upper portion of the molding dies. The upper mold 140 mainly includes an upper mold base portion 141, an upper mold side block 142, an upper mold cavity block 143, an upper mold support 145, and an upper mold pillar 146. In this embodiment, as shown in (b) of FIG. 3, a cull block 144 is provided in the center, the upper mold cavity block 143 is arranged on the left and right sides thereof, and the upper mold side block 142 is arranged on the outer periphery of the upper mold cavity block 143 (excluding the cull block side).

The upper mold base portion 141 is a member that supports the upper mold side block 142 which will be described later. The upper mold base portion 141 is formed in a plate shape having a predetermined thickness vertically. The outer peripheral portion of the upper mold base portion 141 is supported from below by the support portion 132a of the upper mold attachment portion 132. Thereby, the upper mold base portion 141 is supported so as to be movable in the up-down direction with respect to the upper mold setting part 130.

The upper mold side block 142 forms the side surface of a cavity C formed by the upper mold 140. The upper mold side block 142 is an embodiment of a side block of the present application. The upper mold side block 142 is formed in a frame shape with an opening formed at a position corresponding to the resin molded article (cavity C). The upper mold side block 142 is provided on the lower surface of the upper mold base portion 141. An air vent groove 142a is formed in the upper mold side block 142.

The air vent groove 142a shown in FIG. 2 is for discharging the air inside the cavity C to the outside. The air vent groove 142a is formed at an appropriate position on the lower surface of the upper mold side block 142.

The upper mold cavity block 143 forms the upper surface of the cavity C formed by the upper mold 140. The upper mold cavity block 143 is an embodiment of a cavity block of the present application. The upper mold cavity block 143 is arranged inside the upper mold side block 142 (more specifically, inside the opening of the upper mold side block 142). The upper mold cavity block 143 is arranged so as to be relatively movable in the up-down direction with respect to the upper mold side block 142.

The cull block 144 is arranged at a position facing the pot block 112 of the lower mold 110 and forms the side surface of the cavity C formed by the upper mold 140. A groove-shaped cull portion 144a and a runner portion 144b for guiding the resin material into the cavity C are formed on the lower surface of the cull block 144 (see (b) of FIG. 3). FIG. 2 schematically shows how the through hole (pot) of the pot block 112 communicates with the cavity C, which will be described later, via the cull portion 144a and the runner portion 144b so as to facilitate understanding of the flow of the resin.

The upper mold support 145 regulates the upward movement of the upper mold 140 by coming into contact with the upper mold setting part 130 and defines the position of the upper mold 140. The upper mold support 145 is fixed to the upper surface of the upper mold base portion 141. A plurality of upper mold supports 145 are provided at appropriate positions on the upper surface of the upper mold base portion 141.

The upper mold pillar 146 is a member arranged to extend upward from the upper mold cavity block 143. The lower end of the upper mold pillar 146 is fixed to the upper portion of the upper mold cavity block 143. The upper mold pillar 146 is arranged to penetrate the upper mold base portion 141.

FIG. 2 shows a state in which a release film F is sucked to the lower surface of the upper mold 140 (the surface forming the cavity C).

<Disc Spring 150>

The disc spring 150 applies a force downward to the upper mold 140. The disc spring 150 is an embodiment of an application part of the present application. The disc spring 150 is arranged between the lower surface of the upper mold setting part 130 (heater plate 133) and the upper surface of the upper mold 140 (upper mold base portion 141). Due to the urging force of the disc spring 150, the upper mold 140 is constantly applied with a force in a direction away from the upper mold setting part 130 (downward).

<Upper Mold Cavity Adjustment Mechanism 160>

The upper mold cavity adjustment mechanism 160 adjusts the position of the upper mold cavity block 143. The upper mold cavity adjustment mechanism 160 is an embodiment of a position adjustment mechanism of the present application. The upper mold cavity adjustment mechanism 160 includes an upper mold cavity block holding member 161, an upper mold cavity block driving part 162, a regulating member 163, an upper mold elastic member 164, an upper mold first wedge member 165, an upper mold second wedge member 166, and an upper mold wedge member driving part 167.

The upper mold cavity block holding member 161 holds the upper mold cavity block 143. The upper mold cavity block holding member 161 is formed in a hollow frame shape in the front view. The upper mold cavity block holding member 161 is formed by combining a plurality of members (such as upper and lower plate-shaped members and a plurality of columnar members connecting the upper and lower plate-shaped members). The upper mold cavity block holding member 161 is arranged so as to vertically penetrate the upper mold fixing base portion 131. The upper mold cavity block holding member 161 is provided so as to be movable vertically with respect to the upper mold fixing base portion 131. The upper end of the upper mold pillar 146 is fixed to the lower surface of the upper mold cavity block holding member 161. Thereby, the upper mold cavity block holding member 161 can hold the upper mold cavity block 143 via the upper mold pillar 146.

The upper mold cavity block driving part 162 moves the upper mold cavity block holding member 161 in the vertical direction (up-down direction). The upper mold cavity block driving part 162 is formed by, for example, a servomotor, an air cylinder, or the like. The upper mold cavity block driving part 162 is provided in the upper portion of the upper mold cavity block holding member 161. By driving the upper mold cavity block driving part 162, the upper mold cavity block holding member 161 (and thus the upper mold cavity block 143) can be freely moved in the up-down direction with respect to the upper mold setting part 130.

The regulating member 163 regulates the movement of the upper mold cavity block holding member 161 by coming into contact with the upper mold cavity block holding member 161. The regulating member 163 is formed by combining a plurality of members (such as plate-shaped members). The regulating member 163 includes an upper portion that straddles the upper mold cavity block holding member 161 on the left and right sides, and a central portion that is arranged inside the upper mold cavity block holding member 161. The central portion of the regulating member 163 is arranged so as to be capable of contacting the lower portion (bottom portion) of the upper mold cavity block holding member 161 from above. The regulating member 163 can regulate upward movement of the upper mold cavity block holding member 161 by coming into contact with the lower portion of the upper mold cavity block holding member 161 from above. Thereby, the depth of the cavity C can be defined.

The upper mold elastic member 164 applies a force upward to the regulating member 163. The upper mold elastic member 164 is formed by, for example, a compression coil spring. The upper mold elastic member 164 is arranged between the regulating member 163 and the upper mold attachment portion 132. Due to the urging force of the upper mold elastic member 164, the regulating member 163 is constantly applied with an upward force.

The upper mold first wedge member 165 and the upper mold second wedge member 166 are a pair of members in which tapered portions are formed on surfaces facing each other. The upper mold second wedge member 166 is arranged below the upper mold first wedge member 165. The upper mold first wedge member 165 and the upper mold second wedge member 166 are arranged inside the upper mold cavity block holding member 161. More specifically, the upper mold first wedge member 165 and the upper mold second wedge member 166 are arranged between the upper mold fixing base portion 131 and the regulating member 163. The upper mold second wedge member 166 is fixed to the upper surface of the regulating member 163.

The upper mold wedge member driving part 167 moves the upper mold first wedge member 165 in the horizontal direction (left-right direction). The upper mold wedge member driving part 167 is formed by, for example, a servomotor, an air cylinder, or the like. The upper mold wedge member driving part 167 is connected to the upper mold first wedge member 165 via an appropriate power transmission member. By driving the upper mold wedge member driving part 167, the upper mold wedge member driving part 167 can be freely moved in the left-right direction.

The position of the upper mold cavity block 143 can be adjusted by the upper mold cavity adjustment mechanism 160 configured in this way. Specifically, when the upper mold cavity block driving part 162 is driven to move the upper mold cavity block holding member 161 downward, a gap is formed between the regulating member 163 and the lower portion of the upper mold cavity block holding member 161. That is, the regulating member 163 is capable of moving vertically using this gap. In this state, when the upper mold wedge member driving part 167 is driven to move the upper mold first wedge member 165 in the left-right direction, the upper mold second wedge member 166 in contact with the upper mold first wedge member 165 is vertically displaced along the tapered portion. The regulating member 163 is also vertically displaced together with the upper mold second wedge member 166. After adjusting the regulating member 163 to a predetermined position, the upper mold cavity block driving part 162 is driven again to move the upper mold cavity block holding member 161 upward until the upper mold cavity block holding member 161 comes into contact with the regulating member 163. By vertically displacing the regulating member 163 in this way, the position where the upward movement of the upper mold cavity block holding member 161 is regulated is displaced, so the position of the upper mold cavity block 143 can be adjusted.

<Air Vent Opening/Closing Mechanism 170>

The air vent opening/closing mechanism 170 shown in FIG. 2 opens and closes the air vent groove 142a that communicates the cavity C with the outside. The air vent opening/closing mechanism 170 mainly includes an air vent pin 171 and an air vent driving part 172.

The air vent pin 171 is for closing the air vent groove 142a. The air vent pin 171 is provided to be vertically movable in a through hole in the upper mold side block 142 communicating with the air vent groove 142a.

The air vent driving part 172 moves the air vent pin 171 in the up-down direction. The air vent driving part 172 is formed by, for example, a servomotor, an air cylinder, or the like. The air vent driving part 172 is connected to the air vent pin 171 via an appropriate power transmission member. By driving the air vent driving part 172, the air vent pin 171 can be freely moved in the up-down direction. For example, the air vent groove 142a can be closed by moving the air vent pin 171 downward.

<Transfer Mechanism 180>

The transfer mechanism 180 supplies the resin material into the cavity C. The transfer mechanism 180 mainly includes a transfer driving part 181, a plunger 182, and a plunger load measurement part 183.

The transfer driving part 181 is a part (drive source) that moves the plunger 182, which will be described later, in the vertical direction (up-down direction). The transfer driving part 181 is an embodiment of a drive source of the present application. The transfer driving part 181 is formed by, for example, a servomotor, an air cylinder, or the like. The transfer driving part 181 is provided on the lower mold movable base portion 101 below the pot block 112.

The plunger 182 injects the resin tablet T (resin material) housed in the pot block 112 and supplies the resin tablet T into the cavity C. The plunger 182 is arranged so as to be capable of vertically moving (ascending and descending) in the pot block 112.

The plunger load measurement part 183 measures the force applied to the plunger 182 (plunger load). The force applied to the plunger 182 is specifically a force with which the transfer driving part 181 pushes the plunger 182. The plunger load measurement part 183 is formed by, for example, a load cell. The plunger load measurement part 183 is provided between the transfer driving part 181 and the plunger 182.

In this embodiment, between the transfer driving part 181 and the plunger 182, an elastic member or the like (equal pressure mechanism) for uniformizing the force applied to the resin material by each plunger 182 (and thus the resin pressure in the cavity C) is not arranged. Therefore, the plunger 182 moves by a movement amount proportional to the output of the transfer driving part 181. For example, when an air cylinder having an extendable rod is used as the transfer driving part 181 to push up the plunger 182 from below, the plunger 182 also moves by the same amount as the movement amount of the rod of the transfer driving part 181. Further, for example, when the transfer driving part 181 moves the plunger 182 via an appropriate speed reduction mechanism, the plunger 182 moves by a movement amount obtained by multiplying the output of the transfer driving part 181 by the speed reduction ratio of the speed reduction mechanism.

<Shape of Cull Portion 144a>

Since the plunger 182 is configured to move by a movement amount proportional to the output of the transfer driving part 181 in this way, when the resin material is supplied into the cavity C by a plurality of plungers 182, it is desirable to make the resin pressure in the cavity C uniform. In this embodiment, the resin material is supplied from a plurality of plungers 182 (pots) to the common cavity C, and the resin pressure is uniform through the cavity C. As other methods for uniformizing the resin pressure in the cavity C, for example, there are a method for forming a connecting groove 144c that connects the cull portions 144a to each other as shown in (a) of FIG. 4, and a method for further forming a connecting groove 144d that connects the cavities C to each other (supplying the resin material from a plurality of cull portions 144a to the common cavity C) when there are a plurality of cavities C as shown in (b) of FIG. 4. By connecting the cull portions 144a to each other in this way, it is possible to suppress variations in the pressure applied to the resin material due to variations in the plunger load of each plunger 182.

<Mold Clamping Mechanism 190>

The mold clamping mechanism 190 shown in FIG. 2 raises the lower mold 110 and clamps the lower mold 110 and the upper mold 140. The mold clamping mechanism 190 is an embodiment of a clamp mechanism of the present application. The mold clamping mechanism 190 mainly includes a stationary platen 191, a support 192, a driving mechanism 193, and a clamp load measurement part 194.

The stationary platen 191 is a part that is installed on the ground and supports other members. The lower mold 110 (lower mold setting part 100) is provided on the upper portion of the stationary platen 191 via the driving mechanism 193, which will be described later.

The support 192 supports the upper mold 140 (upper mold setting part 130). The support 192 is provided so as to extend upward from the stationary platen 191. The upper mold fixing base portion 131 of the upper mold setting part 130 is fixed to the upper portion of the support 192. Thereby, the upper mold 140 (upper mold setting part 130) is arranged above the lower mold 110 (lower mold setting part 100).

The driving mechanism 193 moves the lower mold 110 (lower mold setting part 100) in the vertical direction (up-down direction). The driving mechanism 193 is formed by, for example, a drive source such as a servomotor and an appropriate power transmission mechanism. The driving mechanism 193 is arranged between the stationary platen 191 and the lower mold setting part 100. By driving the driving mechanism 193, the lower mold setting part 100 can be freely moved (ascended and descended) in the up-down direction. For example, by raising the lower mold 110 toward the upper mold 140 with the driving mechanism 193, the molds can be clamped. Further, by lowering the lower mold 110 in a direction away from the upper mold 140 with the driving mechanism 193, the molds can be opened.

The clamp load measurement part 194 measures the force (clamp load) when the mold clamping mechanism 190 clamps the lower mold 110 and the upper mold 140. The clamp load measurement part 194 is formed by, for example, a load cell, a strain gauge, or the like. The clamp load measurement part 194 is provided on the support 192. The clamp load measurement part 194 is capable of measuring the clamp load based on the load applied to the support 192.

FIG. 2 shows a state in which the lower mold 110 and the upper mold 140 are clamped after the substrate 2 and the resin tablet T are transported to the molding dies.

<Overview of Method for Producing Resin Molded Article>

A method for producing a resin molded article using the resin molding device 1 configured as described above will be described hereinafter.

In this embodiment, when resin molding is performed in the resin molding module 20, control is performed to improve the dimensional precision of the product (specifically, the dimensional precision of the thickness of the molded resin). In order to help understanding of this control, first, the factors causing variations in product dimensions in the resin molding device 1 will be described with reference to FIG. 5.

As shown in (a) of FIG. 5, when the lower mold 110 is raised by the mold clamping mechanism 190 to clamp the lower mold 110 and the upper mold 140, the upper mold side block 142 of the upper mold 140 comes into contact with the lower mold 110. Accordingly, the clamp load from the mold clamping mechanism 190 is mainly applied to the upper mold side block 142. When the clamp load is applied to the upper mold side block 142, the upper mold side block 142 is vertically compressed and slightly deforms, so the depth (thickness in the up-down direction) of the cavity C may decrease.

Further, as shown in (b) of FIG. 5, when resin is supplied into the cavity C by the plunger 182 of the transfer mechanism 180, the pressure from the resin material in the cavity C acts upward on the upper mold cavity block 143. Therefore, the upper mold cavity block 143 is pushed upward and slightly moves or deforms, so the depth of the cavity C may increase.

As described above, when resin molding is performed using the resin molding device 1, the depth of the cavity C may change depending on the operation of each part. Thus, by suppressing this change, it is possible to improve the dimensional precision of the resin molded article. The method for producing a resin molded article (control mode of the clamp load and the plunger load) that is capable of improving the dimensional precision will be described below.

In step S10 of FIG. 6, the volumes of the resin tablet T and the chip 2a on the substrate 2 are measured. A specific description will be given below.

The volume of the resin tablet T is measured by the resin measurement part 15 of the supply module 10 as described above. The resin measurement part 15 is capable of measuring the volume of the resin tablet T using any measurement device. An example of the resin measurement part 15 is a weighing scale for measuring the weight of the resin tablet T. The volume of the resin tablet T is calculated from the weight of the resin tablet T measured by the weighing scale and the specific gravity of the resin tablet T. The method for measuring the volume of the resin tablet T is not particularly limited, and it is possible to measure the volume using various other devices. For example, it is possible to use various types of three-dimensional scanners, laser volume meters using laser beams, or the like.

Furthermore, the volume of the chip 2a on the substrate 2 is measured in the frame measurement part 12 of the supply module 10 as described above. The frame measurement part 12 is capable of measuring the volume of the chip 2a on the substrate 2 using any measurement device. An example of the frame measurement part 12 is a volume meter for measuring the volume of the chip 2a on the substrate 2. The volume meter is a laser volume meter that measures the shape (and thus the volume) of the chip 2a by detecting the distance to the chip 2a on the substrate 2 using laser beams. The method for measuring the volume of the chip 2a is not particularly limited, and it is possible to measure the volume using various other devices. For example, it is possible to use various types of three-dimensional scanners or the like.

Next, in step S20 of FIG. 6, the position of the plunger 182 at a predetermined resin filling rate of the cavity C is calculated. A specific description will be given below.

The controller 18 calculates the capacity of the cavity C based on the dimensions of each part (upper mold side block 142, upper mold cavity block 143, pot block 112, cull block 144, etc.) that are stored in advance, and the vertical position of the upper mold cavity block 143. The vertical position of the upper mold cavity block 143 can be grasped based on the driving amount of the upper mold wedge member driving part 167. Based on the calculated capacity of the cavity C and the volumes of the resin tablet T and the chip 2a measured in step S10, the controller 18 can calculate what percentage of the capacity of the cavity C has been filled with the molten resin material (resin filling rate) at a time point when the plunger 182 rises to a certain position.

In this embodiment, as shown in FIG. 5, the controller 18 calculates the positions (hereinafter referred to as positions P0, P25, P50, P75, and P100, respectively) of the plunger 182 at which the resin filling rates of the cavity C are 0%, 25%, 50%, 75%, and 100%.

Strictly speaking, in a state where the plunger 182 is at a position lower than the position P0, the resin filling rate of the cavity C is 0% regardless of the position of the plunger 182, but in this embodiment, the position where the plunger 182 rises and the resin material starts to be supplied into the cavity C is defined as the position P0 where the resin filling rate is 0%.

Next, in step S30 of FIG. 6, the substrate 2 and the resin tablet T are respectively transported into the molding dies of the resin molding module 20. Specifically, the substrate 2 is placed on the lower mold 110 and the resin tablet T is housed in the pot of the pot block 112.

Next, in step S40 of FIG. 6, the lower mold 110 and the upper mold 140 are clamped by the mold clamping mechanism 190. Specifically, the mold clamping mechanism 190 raises the lower mold 110, and the lower mold 110 comes into contact with the upper mold 140 from below. The cavity C is thereby closed. At this time, as shown in (a) of FIG. 9, the upper mold 140 rises to a position where the upper mold support 145 contacts the upper mold setting part 130 (heater plate 133).

Hereinafter, an example of the changes over time of the clamp load (units are, for example, tonf, N, or the like), the plunger position (vertical position of the plunger 182 with the initial position set to 0, and units are, for example, mm or the like), and the plunger load (units are, for example, tonf, N, or the like) accompanying the operation of the resin molding device 1 will be described together using the graph shown in FIG. 7.

By clamping the lower mold 110 and the upper mold 140 in step S40, the clamp load rises to CL1 at time t1 in FIG. 7.

Next, in step S50 of FIG. 6, the plunger 182 starts to rise (time t2 in FIG. 7).

Next, in step S60 of FIG. 6, filling rate correspondence control is executed. The filling rate correspondence control is to control the operation of the resin molding device 1 based on the resin filling rate of the cavity C.

An example of the filling rate correspondence control is shown in FIG. 8. FIG. 8 shows an example of controlling the clamp load and the moving speed of the plunger 182 based on the resin filling rate.

Specifically, when the position of the plunger 182 reaches the position P50 (the position where the resin filling rate is 50%) (YES in step S61), the clamp load is raised from CL1 to CL2 (step S62). In FIG. 7, the plunger 182 reaches the position P50 at time t3, and the clamp load is increased from CL1 to CL2 from time t3 to time t4.

Further, when the position of the plunger 182 reaches the position P50 (the position where the resin filling rate is 50%) (YES in step S61), the moving speed of the plunger 182 is adjusted (step S62). In FIG. 7, the change over time of the plunger 182 (inclination of the graph of the plunger position) is gentle at time t3. That is, the moving speed of the plunger 182 is adjusted to be slow.

Next, when the position of the plunger 182 reaches the position P100 (the position where the resin filling rate is 100%) (YES in step S63), the plunger 182 is stopped (step S64). In FIG. 7, the plunger 182 reaches the position P100 at time t5, and the movement (rise) of the plunger 182 is stopped.

FIG. 8 shows an example in which the clamp load and the moving speed of the plunger 182 are adjusted only once as a result of the resin filling rate reaching 50%, but the number of times of adjustment is not limited thereto, and it is also possible to perform adjustment multiple times. For example, it is also possible to adjust the clamp load, etc. each time the resin filling rate reaches 25%, 50%, and 75% (the plunger 182 is at the positions P25, P50, and P75). Moreover, the resin filling rate that triggers this adjustment is not limited to the above example, and may be set freely.

By increasing the clamp load stepwise according to the resin filling rate in this way, the depth of the cavity C can be suppressed from changing. Specifically, as the resin filling rate increases, the force with which the resin material pushes the upper mold cavity block 143 upward increases, so the depth of the cavity C increases (see (b) of FIG. 5). Thus, by increasing the clamp load according to the resin filling rate as described above, the depth of the cavity C is decreased (see (a) of FIG. 5), which makes it possible to offset the tendency of the change in the depth of the cavity C (increase and decrease in depth) and suppress the change in the depth of the cavity C.

In addition, by adjusting the moving speed of the plunger 182 according to the resin filling rate, it is possible to suppress the occurrence of non-filling of the resin material. Specifically, since the resin material flowing in the cavity C flows through relatively easy-to-flow portions (for example, portions of the substrate 2 where the chip 2a is not provided) and relatively difficult-to-flow portions (for example, the chip 2a portion of the substrate 2), it may be desirable to adjust the flow rate to improve resin circulation. Thus, by adjusting the moving speed of the plunger 182 according to the resin filling rate as described above, it is possible to improve resin circulation.

Further, in this embodiment, the resin filling rate (the position of the plunger 182 corresponding to the resin filling rate) is calculated based on the values obtained by actually measuring the volumes of the resin tablet T and the chip 2a of the substrate 2, so it is possible to precisely grasp the resin filling rate of the cavity C regardless of variations in the volume of each resin tablet T. Thereby, the change in the depth of the cavity C can be suppressed more precisely.

An appropriate value of the clamp load and an appropriate moving speed of the plunger 182 for the resin filling rate can be determined in advance by experiment, numerical analysis, or the like.

Next, in step S70 of FIG. 6, cavity control is performed. The cavity control is to adjust the position of the upper mold cavity block 143 before pressure adjustment control, which will be described later.

Specifically, in a state where the lower mold 110 and the upper mold 140 are clamped as shown in (a) of FIG. 9, the clamp load is reduced as shown in (b) of FIG. 9. At this time, the clamp load is reduced while the upper mold cavity block holding member 161 is pressed downward by the upper mold cavity block driving part 162. In FIG. 7, the clamp load is reduced from CL2 to CLdown at time t6. At this time, there is a risk that the depth of the cavity C may increase due to the decrease in the clamp load. However, since the upper mold cavity block holding member 161 is pressed downward by the upper mold cavity block driving part 162, it is possible to suppress the cavity C from becoming deep.

When the clamp load decreases, as shown in (b) of FIG. 9, the upper mold 140 is relatively moved in a direction away from the upper mold setting part 130 by the disc spring 150, so a slight gap (see part A in (b) of FIG. 9) is formed between the regulating member 163 and the upper mold cavity block holding member 161.

A movable range of the upper mold second wedge member 166 is secured by formation of such a gap. That is, the upper mold second wedge member 166 is capable of moving vertically. By driving the upper mold wedge member driving part 167 in this state, the position of the upper mold cavity block 143 can be freely adjusted.

For example, in the example shown in FIG. 7, the upper mold cavity block 143 is lowered slightly. Thereby, it is possible to slightly reduce the depth of the cavity C, and in pressure adjustment control (step S80), first final adjustment control (step S90), and second final adjustment control (step S100), which will be described later, it becomes easy to apply a high pressure to the resin material in the cavity C.

Next, in step S80 of FIG. 6, the pressure adjustment control is executed. The pressure adjustment control is to adjust the clamp load to raise the pressure applied to the resin material in the cavity C.

Specifically, as shown in FIG. 7, the clamp load is increased from CLdown to CLM (preset clamp load) (time t7). At this time, the plunger 182 is stopped. Therefore, the resin material filled in the cavity C supports the increase in the clamp load and the shallowness of the cavity C, so the change in the depth of the cavity C is suppressed. Further, this raises the pressure applied to the resin material in the cavity C, which makes it possible to suppress the occurrence of non-filling of resin and improve the precision of the resin molded article. FIG. 7 shows how the plunger load increases as the pressure in the cavity C increases.

Next, in step S90 of FIG. 6, the first final adjustment control is executed. The first final adjustment control is to adjust the clamp load to a preset final clamp load.

Specifically, as shown in FIG. 7, the clamp load is increased from CLM to CLf (final clamp load) (time t8). At this time, the plunger 182 is stopped. Therefore, the resin material filled in the cavity C supports the increase in the clamp load and the shallowness of the cavity C, so the change in the depth of the cavity C is suppressed. Further, this raises the pressure applied to the resin material in the cavity C, which makes it possible to suppress the occurrence of non-filling of resin and improve the precision of the resin molded article.

Next, in step S100 of FIG. 6, the second final adjustment control is executed. The second final adjustment control is to adjust the plunger load to a preset final plunger load.

Specifically, as shown in FIG. 7, the plunger 182 is moved so that the plunger load becomes Trf (time t9). In the example shown in FIG. 7, since the plunger load is less than Trf at the time point (time t8) when the first final adjustment control is completed, the plunger 182 is raised to increase the plunger load to Trf.

For example, when the plunger load is greater than Trf at the time point (time t8) when the first final adjustment control is completed, in step S100, the plunger 182 is lowered to reduce the plunger load to Trf. Further, when the plunger load is Trf at the time point (time t8) when the first final adjustment control is completed, in step S100, the plunger load is held at Trf without moving the plunger 182. By adjusting the final plunger load to the preset value in this way, it is possible to improve the precision of the resin molded article.

If the plunger 182 is moved as in the second final adjustment control, though the pressure applied to the resin material in the cavity C can be efficiently adjusted, the amount of the resin material in the cavity C changes and the depth of the cavity C tends to change. Thus, in this embodiment, the clamping force is increased in advance to the final clamping force in the first final adjustment control, and accordingly the plunger load is increased to a value close to the final plunger load. As a result, it is possible to keep the movement amount of the plunger 182 in the second final adjustment control small, so it is possible to suppress the change in the depth of the cavity C.

Next, in step S110 of FIG. 6, the resin molding device 1 waits until a cure time (hardening time) elapses while holding the clamp load and the plunger load.

Next, in step S120 of FIG. 6, the plunger 182 is lowered to reduce the plunger load, and the mold clamping mechanism 190 opens the lower mold 110 and the upper mold 140.

Next, in step S130 of FIG. 6, the substrate 2 for which resin molding (resin sealing) has been completed is unloaded from the molding dies. The unloaded substrate 2 is transported to the unloading module 30.

As described above, by properly controlling the clamp load and the plunger load, it is possible to suppress the change in the depth of the cavity C and improve the dimensional precision of the resin molded article.

<Another Example of Control Mode>

Another example of the method for producing a resin molded article (control mode of the clamp load and the plunger load) will be described below.

The example shown in FIG. 10 shows another example of the control mode for the clamp load, etc. shown in FIG. 7. For convenience, the control mode shown in FIG. 7 is referred to as the first control mode, and the control mode shown in FIG. 10 is referred to as the second control mode hereinafter. The second control mode shown in FIG. 10 differs from the first control mode shown in FIG. 7 mainly in the control contents (step S70 and step S80 of FIG. 6) from time t6 to time t7. This difference will be described below.

In the first control mode, the position of the upper mold cavity block 143 is adjusted so that the depth of the cavity C decreases in the cavity control in step S70 of FIG. 6, but in the second control mode, the position of the upper mold cavity block 143 is adjusted so that the depth of the cavity C increases.

That is, in the second control mode, in step S70, the upper mold wedge member driving part 167 is driven while the clamp load is reduced to CLdown, and the upper mold cavity block 143 is slightly raised. Thus, the depth of the cavity C slightly increases.

Next, in step S80 of FIG. 6, the pressure adjustment control is executed. Here, as described above, in the second control mode, the depth of the cavity C is adjusted to increase in step S70. As the depth of the cavity C increases in this way, the capacity of the cavity C also changes (increases), so the resin filling rate, which was 100%, drops below 100%.

Thus, the controller 18 recalculates the relationship between the resin filling rate of the cavity C and the position of the plunger 182 at this time point. This calculation method is the same as in step S20.

Next, the clamp load is increased from CLdown to CLM2 (time t7). At this time, since the resin filling rate drops below 100%, while the plunger 182 is raised to supply the resin material into the cavity C, the clamp load CL is raised stepwise. That is, as in the above-described filling rate correspondence control (step S60), the clamp load is increased stepwise, triggered as a result of the plunger 182 reaching the position corresponding to the predetermined resin filling rate. At this time, it is also possible to adjust the moving speed of the plunger 182. The example shown in FIG. 10 shows an example in which the clamp load is increased by two steps, CLM1 and CLM2.

Thus, even in the pressure adjustment control (step S80), the change in the depth of the cavity C can be suppressed by increasing the clamp load stepwise according to the resin filling rate, as in the filling rate correspondence control (step S60). However, in the pressure adjustment control, it is also possible to adopt a configuration in which the above-described filling rate correspondence control is not performed.

Furthermore, in the example shown, the clamp load and the moving speed of the plunger 182 are adjusted according to the resin filling rate in the filling rate correspondence control (step S60) described above. However, as another example, it is also possible to control the operation of the air vent opening/closing mechanism 170 (see FIG. 2) according to the resin filling rate. For example, when the resin filling rate reaches the predetermined value (when the plunger 182 reaches a position corresponding to the predetermined resin filling rate), it is also possible to lower the air vent pin 171 to close the air vent groove 142a. Thus, the opening and closing of the air vent groove 142a can be accurately controlled according to the resin filling rate.

Further, in the example shown, each part is controlled with the position of the plunger 182 corresponding to each resin filling rate (0%, 25%, 50%, 75%, and 100%) as a trigger in the filling rate correspondence control (step S60) described above, but the control method is not limited thereto, and it is also possible to perform control triggered by other positions based on these positions, for example.

For example, when the plunger 182 is raised (when the resin material is supplied into the cavity C), it is possible to perform control such as adjusting the moving speed of the plunger 182 and closing the air vent groove 142a, triggered as a result of the plunger 182 reaching a position below the position P0 by a predetermined distance (for example, 5 mm) based on the position P0 of the plunger 182 where the resin filling rate is 0%.

By performing the control triggered as a result of the plunger 182 reaching a position below the position P0 in this way, it is possible to perform control based on the position of the plunger 182 before the cavity C is supplied with the resin material. Thus, it is possible to control each part, for example, immediately before the resin material starts to be supplied into the cavity C or even at the same timing as the start of the supply (timing that does not depend on the resin filling rate).

As described above, the resin molding device 1 according to this embodiment includes the lower mold 110 on which the substrate 2 is placed; the upper mold 140 in which the cavity C is formed by the upper mold side block 142 (side block) and the upper mold cavity block 143 (cavity block) provided so as to be capable of ascending and descending vertically with respect to the upper mold side block 142; the mold clamping mechanism 190 (clamp mechanism) which clamps the lower mold 110 and the upper mold 140; the transfer mechanism 180 which supplies the resin material into the cavity C by the plunger 182; and the controller 18 which performs first final adjustment control (step S90) for adjusting the clamp load provided by the mold clamping mechanism 190 to be the final clamp load after the cavity C is filled with the resin material supplied from the transfer mechanism 180, and performs second final adjustment control (step S100) for adjusting the plunger load applied to the plunger 182 to be the final plunger load by driving the plunger 182 after the first final adjustment control is completed.

By configuring in this way, a highly precise resin molded article can be produced. That is, before the second final adjustment control (adjustment of the plunger load performed by the plunger 182), the clamp load can be adjusted by the first adjustment control in advance, making it possible to suppress the movement amount of the plunger 182 in the second final adjustment control. Thereby, a change in the depth of the cavity C can be suppressed.

Further, the controller 18 raises the clamp load provided by the mold clamping mechanism 190 in the first final adjustment control.

By configuring in this way, the movement amount of the plunger 182 in the second final adjustment control can be effectively suppressed. Thereby, a change in the depth of the cavity C can be suppressed.

Further, the controller 18 performs the pressure adjustment control (step S80) to raise the resin pressure in the cavity C by adjusting the clamp load provided by the mold clamping mechanism 190 after the cavity C is filled with the resin material and before performing the first final adjustment control.

By configuring in this way, the occurrence of non-filling of resin can be suppressed to improve the precision of the resin molded article.

In addition, the controller 18 performs the cavity control (step S70) to adjust the relative position of the upper mold cavity block 143 with respect to the upper mold side block 142 before performing the pressure adjustment control.

By configuring in this way, the depth of the cavity C in the pressure adjustment control can be freely adjusted in advance.

In addition, in the cavity control, the controller 18 relatively moves the upper mold cavity block 143 with respect to the upper mold side block 142 in a state of reducing the clamp load provided by the mold clamping mechanism 190.

By configuring in this way, the upper mold cavity block 143 can be easily moved by reducing the clamp load.

Besides, the resin molding device 1 further includes the upper mold setting part 130 (upper mold support part) which supports the upper mold 140 so as to be vertically movable; the upper mold cavity adjustment mechanism 160 (position adjustment mechanism) which is provided in the upper mold setting part 130 and capable of adjusting the position of the upper mold cavity block 143; and the disc spring 150

(application part) which applies a force to the upper mold 140 in a direction that secures the movable range of the upper mold cavity adjustment mechanism 160.

By configuring in this way, the movable range of the upper mold cavity adjustment mechanism 160 (upper mold second wedge member 166) can be secured, and the position adjustment of the upper mold cavity block 143 performed by the upper mold cavity adjustment mechanism 160 can be easily performed.

Further, the controller 18 adjusts the position of the upper mold cavity block 143 so that the cavity C is deepened using the movable range secured by the disc spring 150 in the cavity control, and raises the clamp load provided by the mold clamping mechanism 190 while supplying the resin material into the cavity C by the transfer mechanism 180 in the pressure adjustment control.

By configuring in this way, the occurrence of non-filling of resin can be suppressed by resupplying the resin material into the cavity C that has been filled with the resin material once, making it possible to improve the precision of the resin molded article.

Further, the transfer mechanism 180 includes the transfer driving part 181 (drive source) for driving the plunger 182, and moves the plunger 182 by a movement amount proportional to the output of the transfer driving part 181.

By configuring in this way, the clamp load and the plunger load can be adjusted with relatively high precision. That is, since the plunger 182 can be moved to completely follow the output of the transfer driving part 181 without any elastic member or the like interposed between the transfer driving part 181 and the plunger 182, it is possible to precisely perform control of each part triggered by the position of the plunger 182 (and thus the resin filling rate). The adjustment of the plunger load provided by the plunger 182 can also be precisely performed.

Moreover, the method for producing a resin molded article according to this embodiment produces a resin molded article using the resin molding device 1.

By configuring in this way, a highly precise resin molded article can be produced.

Furthermore, the method for producing a resin molded article according to this embodiment includes a clamping process (step S40) of clamping, with the mold clamping mechanism 190, the lower mold 110 on which the substrate 2 is placed and the upper mold 140 in which the cavity C is formed by the upper mold side block 142 and the upper mold cavity block 143 provided so as to be capable of ascending and descending vertically with respect to the upper mold side block 142; a resin material supplying process (step S50 and step S60) of supplying the resin material into the cavity C by the plunger 182; a first final adjusting process (step S90) of adjusting the clamp load provided by the mold clamping mechanism 190 to be the final clamp load after the cavity C is filled with the resin material; and a second final adjusting process (step S100) of driving the plunger 182 so that the plunger load applied to the plunger 182 becomes the final plunger load after the clamp load provided by the mold clamping mechanism 190 becomes the final clamp load.

By configuring in this way, a highly precise resin molded article can be produced. That is, before the second final adjustment control (adjustment of the plunger load performed by the plunger 182), the clamp load can be adjusted by the first adjustment control in advance, making it possible to suppress the movement amount of the plunger 182 in the second final adjustment control. Thereby, a change in the depth of the cavity C can be suppressed.

Further, as described above, the resin molding device 1 according to this embodiment includes the lower mold 110 on which the substrate 2 is placed; the upper mold 140 in which the cavity C is formed by the upper mold side block 142 (side block) and the upper mold cavity block 143 (cavity block) provided so as to be capable of ascending and descending vertically with respect to the upper mold side block 142; the mold clamping mechanism 190 (clamp mechanism) which clamps the lower mold 110 and the upper mold 140; the transfer mechanism 180 which supplies the resin material into the cavity C by the plunger 182; and the controller 18 which uses the relationship between the position of the plunger 182 and the resin filling rate of the cavity C calculated based on the volume of the chip 2a arranged on the substrate 2 and the volume of the resin material (resin tablet T), and performs the filling rate correspondence control (step S60, step S80 in the second control mode) for controlling the operation related to resin molding triggered as a result of the plunger 182 reaching the position corresponding to the predetermined resin filling rate.

By configuring in this way, a highly precise resin molded article can be produced. That is, since the resin filling rate can be accurately grasped based on the volumes of the resin tablet T and the chip 2a of the substrate 2 actually used, each part can be controlled based on this resin filling rate. Thus, it is possible to improve the precision of the resin molded article.

In addition, in the filling rate correspondence control, the controller 18 performs clamping force adjustment control (step S60) which adjusts the clamp load applied by the mold clamping mechanism 190 triggered as a result of the plunger 182 reaching the position corresponding to the predetermined resin filling rate.

By configuring in this way, the clamp load can be adjusted to suppress the change in the depth of the cavity C according to the resin filling rate, making it possible to improve the precision of the resin molded article.

Furthermore, in the clamping force adjustment control, the controller 18 raises the clamp load applied by the mold clamping mechanism 190 stepwise.

By configuring in this way, it is possible to suppress the depth of the cavity C from increasing as the resin filling rate increases by raising the clamp load.

In addition, in the filling rate correspondence control, the controller 18 performs plunger speed adjustment control (step S60) which adjusts the moving speed of the plunger 182 triggered as a result of the plunger 182 reaching the position corresponding to the predetermined resin filling rate.

By configuring in this way, the flow rate of the resin material can be adjusted according to the resin filling rate, and thus the precision of the resin molded article can be improved.

Further, in the filling rate correspondence control, the controller 18 performs air vent switching control (step S60) which switches between opening and closing of the air vent groove 142a connected to the cavity C triggered as a result of the plunger 182 reaching the position corresponding to the predetermined resin filling rate.

By configuring in this way, the flow of the resin material can be adjusted with high precision by opening/closing the air vent groove 142a according to the resin filling rate, and thus the precision of the resin molded article can be improved.

Moreover, the resin molding device 1 further includes the frame measurement part 12 (chip volume measurement part) which measures the volume of the chip 2a placed on the substrate 2; the resin measurement part 15 (resin volume measurement part) which measures the volume of the resin material (resin tablet T); and the calculation part (controller 18) which calculates the relationship between the resin filling rate and the position of the plunger 182 based on the measurement results of the frame measurement part 12 and the resin measurement part 15.

By configuring in this way, the position (resin filling rate) of the plunger 182 can be grasped based on the actually measured volumes of the chip 2a and the resin material. Thus, it is possible to perform highly accurate control even if the volumes of the resin material (resin tablet T) and the chip 2a vary, for example.

Further, the resin molding device 1 further includes the upper mold setting part 130 (upper mold support part) which supports the upper mold 140 so as to be vertically movable; the upper mold cavity adjustment mechanism 160 (position adjustment mechanism) which is provided in the upper mold setting part 130 and capable of adjusting the position of the upper mold cavity block 143; and the disc spring 150 (application part) which applies a force to the upper mold 140 in a direction that secures the movable range of the upper mold cavity adjustment mechanism 160. The controller 18 performs cavity control for adjusting the relative position of the upper mold cavity block 143 with respect to the upper mold side block 142 so that the cavity C is deepened using the movable range secured by the disc spring 150 after the cavity C is filled with the resin material, and performs pressure adjustment control for adjusting the clamp load applied by the mold clamping mechanism 190 to raise the resin pressure in the cavity C after the cavity control, and the filling rate correspondence control is performed in the pressure adjustment control.

By configuring in this way, it is possible to control each part based on the resin filling rate even in the pressure adjustment control, so the precision of the resin molded article can be improved.

Moreover, the method for producing a resin molded article according to this embodiment produces a resin molded article using the resin molding device 1.

By configuring in this way, a highly precise resin molded article can be produced.

Furthermore, the method for producing a resin molded article according to this embodiment includes a chip volume measuring process (step S10) of measuring the volume of the chip 2a placed on the substrate 2; a resin volume measuring process (step S10) of measuring the volume of the resin material; a plunger position calculating process (step S20) of calculating the relationship between the resin filling rate of the cavity C and the position of the plunger 182 based on the volume of the chip 2a and the volume of the resin material measured; and a filling rate correspondence controlling process (step S60, step S80 in the second control mode) of controlling the operation related to resin molding triggered as a result of the plunger 182 reaching the position corresponding to the predetermined resin filling rate.

By configuring in this way, a highly precise resin molded article can be produced. That is, since the resin filling rate can be accurately grasped based on the volumes of the resin tablet T and the chip 2a of the substrate 2 actually used, each part can be controlled based on this resin filling rate. Thus, it is possible to improve the precision of the resin molded article.

Although the embodiments of the present invention have been described above, the present invention is not limited to the above embodiments, and it is possible to make proper modifications within the scope of the technical ideas of the invention described in the claims.

For example, the components (supply module 10, etc.) used in the resin molding device 1 of the above embodiment are examples, and may be detached or replaced as appropriate. For example, it is possible to change the number of resin molding modules 20. Also, the configuration and operation of the components (supply module 10, etc.) used in the resin molding device 1 of this embodiment are examples, and may be changed as appropriate.

Moreover, although the above embodiment illustrates an example of using a tablet-shaped resin material (resin tablet T), the present invention is not limited thereto. That is, it is possible to use not only a tablet-shaped material but also a granular material, a powder-like material, a liquid-like material, or the like as the resin material.

Further, although the above embodiment illustrates an example in which the cull portion 144a and the runner portion 144b are formed in the cull block 144, a part of the cull portion 144a and the runner portion 144b may also be formed in the pot block 112, for example. In addition, although the above embodiment illustrates an example in which the pot block 112 is provided with a plurality of through holes (pots), the number of through holes may be one.

Besides, the control mode illustrated in the above embodiment is an example, and the detailed control contents (for example, target values of the clamp load and plunger load, control timing, etc.) may be freely changed. For example, although the above embodiment illustrates an example in which the second final adjustment control (step S100) is executed after the first final adjustment control (step S90) is completed, it is also possible to start the second final adjustment control before the first final adjustment control is completed.

Furthermore, although the above embodiment illustrates an example in which the disc spring 150 is used as the application part that applies a force to the upper mold 140, the present invention is not limited thereto, and various other configurations may be adopted. For example, it is also possible to use various elastic members and actuators such as air cylinders as the application part.

In addition, although the above embodiment illustrates an example in which the volume of the chip 2a or the like of the substrate 2 is measured by the frame measurement part 12 and the resin measurement part 15 provided in the resin molding device 1, the present invention is not limited thereto. For example, the resin molding device 1 may also perform resin molding using the substrate 2 or the resin tablet T whose volume is measured outside. In this case, the resin molding device 1 does not need to include the frame measurement part 12 and the resin measurement part 15.

Further, although the above embodiment illustrates the clamping force adjustment control for adjusting the clamp load, the plunger speed adjustment control for adjusting the moving speed of the plunger 182, and the air vent switching control for switching between opening and closing of the air vent groove 142a as examples of the filling rate correspondence control, the present invention is not limited thereto, and it is possible to control any operation related to resin molding.

The invention claimed is:

1. A resin molding device, comprising:
a lower mold on which a substrate is placed;
an upper mold in which a cavity is formed by a side block and a cavity block that is provided so as to be capable of ascending and descending vertically with respect to the side block;
a clamp mechanism, clamping the lower mold and the upper mold;
a transfer mechanism, supplying a resin material to the cavity by a plunger; and
a controller, sequentially performing a clamping process control, a plunger control, a filling rate correspondence control, a first final adjustment control, and a second final adjustment control,
wherein the controller performs the clamping process control to provide a first clamp load by clamping the lower mold and the upper mold,
during a clamp load is maintained at the first clamp load, the controller performs the plunger control with the transfer mechanism by raising the plunger to fill the cavity with a molten resin which leads increasing of a plunger load applied to the plunger,
when the plunger reaches a predetermined position, the controller performs the filling rate correspondence control, wherein the controller applies the clamp mechanism to raise the first clamp load to a second clamp load, and then stops raising the plunger,
the first final adjustment control adjusts the clamp load applied by the clamp mechanism to be a final clamp load, which is larger than the second clamp load, in a state where the plunger is stopped, and
the second final adjustment control adjusts the plunger load applied to the plunger to be a final plunger load, which is a largest load, by raising the plunger in a state where the clamp load is maintained at the final clamp load.

2. The resin molding device according to claim 1, wherein the controller, after the cavity is filled with the resin material and before performing the first final adjustment control, performs pressure adjustment control that adjusts the clamp load applied by the clamp mechanism and raises a resin pressure in the cavity.

3. The resin molding device according to claim 2, wherein the controller, before performing the pressure adjustment control, performs cavity control that adjusts a relative position of the cavity block with respect to the side block.

4. The resin molding device according to claim 3, wherein the controller, in the cavity control, relatively moves the cavity block with respect to the side block in a state in which the clamp load applied by the clamp mechanism is reduced.

5. The resin molding device according to claim 4, further comprising:
an upper mold support part, supporting the upper mold so as to be vertically movable;
a position adjustment mechanism, provided in the upper mold support part and capable of adjusting a position of the cavity block; and
an application part, applying a force to the upper mold in a direction that secures a movable range of the position adjustment mechanism.

6. The resin molding device according to claim 5, wherein
the controller adjusts the position of the cavity block so that the cavity is deepened using the movable range secured by the application part in the cavity control, and
the controller raises the clamp load applied by the clamp mechanism while supplying the resin material to the cavity by the transfer mechanism in the pressure adjustment control.

7. The resin molding device according to claim 1, wherein the transfer mechanism comprises a drive source driving the plunger, and moves the plunger by a movement amount proportional to output of the drive source.

8. A method for producing a resin molded article, producing a resin molded article using the resin molding device according to claim 1.

9. A method for producing a resin molded article, sequentially comprising:
clamping a lower mold and an upper mold by a clamp mechanism to provide a first clamp load, the lower mold having a substrate placed thereon, the upper mold having a cavity formed therein by a side block and a cavity block that is provided so as to be capable of ascending and descending vertically with respect to the side block;
during a clamp load is maintained at the first clamp load, supplying a resin material to the cavity by a plunger by raising the plunger to fill the cavity with a molten resin, leading increasing of a plunger load applied to the plunger;
when the plunger reaches a predetermined position, applying the clamping mechanism to raise the first clamp load to a second clamp load, and then stopping raising the plunger;
adjusting the clamp load applied by the clamp mechanism to be a final clamp load, which is larger than the second clamp load, in a state where the plunger is stopped; and
adjusting the plunger load applied to the plunger to be a final plunger load, which is a largest load, by raising the plunger in a state where the clamp load is maintained at the final clamp load.

* * * * *